United States Patent
Aruga et al.

(10) Patent No.: US 6,278,928 B1
(45) Date of Patent: *Aug. 21, 2001

(54) TRANSMISSION CONTROL DEVICE RESPONSIVE TO ROAD INFORMATION

(75) Inventors: Hideki Aruga; Masao Kawai; Mitsugi Yamashita; Takahiro Iwami; Hideki Nakashima; Shuzo Moroto; Hisanori Shirai, all of Aichi-ken (JP)

(73) Assignee: Kabushikikaisha Equos Research (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/973,681
(22) PCT Filed: Apr. 14, 1997
(86) PCT No.: PCT/JP97/01287
§ 371 Date: Dec. 9, 1997
§ 102(e) Date: Dec. 9, 1997
(87) PCT Pub. No.: WO97/39260
PCT Pub. Date: Oct. 23, 1997

(30) Foreign Application Priority Data

| Apr. 12, 1996 | (JP) | 8-115575 |
| May 29, 1996 | (JP) | 8-157472 |
| Jun. 14, 1996 | (JP) | 8-175601 |
| Jul. 19, 1996 | (JP) | 8-208893 |
| Aug. 10, 1996 | (JP) | 8-227725 |
| Sep. 6, 1996 | (JP) | 8-257413 |

(51) Int. Cl.[7] ................................. F16H 61/00
(52) U.S. Cl. .................. 701/65; 701/208; 477/97
(58) Field of Search ............... 701/51, 65, 208; 477/97

(56) References Cited

U.S. PATENT DOCUMENTS

| 5,337,245 | * | 8/1994 | Matsuzaki | 701/208 |
| 5,661,650 | * | 8/1997 | Sekine et al. | 701/82 |
| 5,716,301 | * | 2/1998 | Wild et al. | 477/97 |
| 5,765,117 | * | 6/1998 | Horiguchi | 701/51 |
| 5,832,400 | * | 11/1998 | Takahashi et al. | 701/53 |
| 5,893,894 | * | 4/1999 | Moroto et al. | 701/53 |
| 5,911,771 | * | 6/1999 | Reichart et al. | 701/65 |
| 5,931,886 | * | 8/1999 | Moroto et al. | 701/54 |
| 5,983,154 | * | 11/1999 | Morisawa | 701/56 |
| 6,012,009 | * | 1/2000 | Kronenberg et al. | 701/56 |

FOREIGN PATENT DOCUMENTS

| 43 37 163 A1 | | 5/1994 | (DE) . |
| 745 788 A1 | * | 12/1996 | (EP) . |
| 752 548 A2 | * | 1/1997 | (EP) . |
| 62-292947 | * | 12/1987 | (JP) . |
| 4327059 | | 11/1992 | (JP) . |
| 5322591 | | 12/1993 | (JP) . |
| 882365 | | 3/1996 | (JP) . |
| 8318765 | | 12/1996 | (JP) . |

OTHER PUBLICATIONS

Hamberger et al. "Digital Maps as Data Base for Adaptive Drive–Train Management" vol. 98, No. 4, pp. 218–222 (Apr. 1, 1996).

\* cited by examiner

Primary Examiner—Michael J. Zanelli
(74) Attorney, Agent, or Firm—Lorusso & Loud

(57) ABSTRACT

A vehicle control device controls an automatic transmission by utilizing road information stored in a navigation system unit. In response to the road information stored in a data memory, the upper-limit of a shiftable transmission speed range is determined, thereby allowing shift-change only within the restricted transmission range. The actual downshift is carried out after confirming a decelerating operation by the driver, such as release of the accelerator pedal, thereby providing favorable transmission control in conformity with the driver's intention.

17 Claims, 30 Drawing Sheets

14...RELEASE SWITCH
15...COMMUNICATION UNIT
16...INPUT UNIT
17...DISPLAY UNIT
18...VOICE INPUT UNIT
19...VOICE OUTPUT UNIT

31...VEHICLE SPEED SENSOR
32...BRAKE SENSOR
33...ACCELERATOR SENSOR
34...BLINKER SENSOR
35...THROTTLE OPENING SENSOR

TRANSMISSION CONTROL DEVICE RESPONSIVE TO ROAD INFORMATION

TECHNICAL FIELD

This invention relates to a vehicle control device that conducts vehicle control based on road information, and more particularly to a vehicle control device that controls transmission gear ratios based on information for the road ahead.

BACKGROUND OF THE ART

The prior art for controlling transmission stages by utilizing road data stored in a navigation system mounted on a vehicle includes Japanese patent publication No. 6-272753 and Japanese patent laid-open publication No.7-234991 which have proposed a control device that controls the transmission stage based on various items of information, including vehicle speed variation and degree of accelerator opening, that can be detected by sensors, and map information read out from the navigation system. Such a device provides the vehicle with an optimum transmission stage in conformity to the varying drive conditions.

With the above-described prior art transmission control devices, road data is obtained from the navigation system in order to determine a transmission stage in conformity with the condition of the road on which the vehicle is now running. However, all information used in such prior art control systems merely indicates the current drive conditions. With the prior art systems, it is not possible to control the transmission in anticipation of future changes in the drive conditions.

For example, when the vehicle goes up a slope, the prior art control devices can not change a transmission stage until the vehicle goes up to a certain level that results in a change in an actual vehicle speed or degree of accelerator opening. Moreover, this prior art control, while following the road information neglects the driver's will or intention. More specifically, the transmission stage control based on the road information has a good adaptability to surrounding conditions, but tends to force a perfunctory control on the driver.

Further, the above-described prior art control device encounters a difficult problem if there is a difference between the detected vehicle position detected by a current vehicle position sensor and the actual vehicle position.

Furthermore, when a transmission shift change pattern is controlled based on road data for example, a up-shift is prohibited during driving around a corner or a bend in the road, whereas shift change points become higher during high-speed driving. However, the prior art transmission control devices can not control the transmission when the vehicle is driving around a corner at high speed.

In most cases, there are multiple conditions for the road, for example, a curved highway or speedway, and a climbing straight-away with a low friction coefficient, and the prior art devices can not provide suitable transmission control when. driving on such a road.

Accordingly, it is an object of this invention to achieve vehicle control that conforms well to the driver's intention, and more particularly to provide a vehicle control device that achieves more favorable control in response to a driver's decelerating operation.

SUMMARY OF THE INVENTION

To achieve the above object, the present invention provides a vehicle control device for a vehicle including means for obtaining road information, current position sensor means for detecting an on-road current position, means for determining a control parameter for the vehicle's automatic transmission in accordance with the detected current position and the obtained road information, deceleration sensor means for detecting a driver's decelerating operation, and execution means for executing control of the determined control parameter when the driver's decelerating operation is detected by said deceleration sensor means.

The control parameter may be a gear ratio range of the automatic transmission or upper and/or lower limits for the gear ratios of the automatic transmission.

The control parameter determining means may comprise first means for determining a plurality of control parameters in accordance with different items of road information and second means for determining the control parameter to be executed by said execution means among those determined by said first means. The control parameter determining means may include drive condition sensor means for detecting a drive condition of the vehicle and determining the control parameter based on the detected drive condition. In one embodiment the control parameter determining means includes forward position sensor means for detecting a specific position ahead of the vehicle, deceleration inference means for inferring a need for deceleration in accordance with the road information for the detected specific position, and select means for selectively determining the control parameter when the deceleration inference means infers a need for deceleration. The control parameter determining means may further include distance calculating means for calculating distance from the current position to the specific position, whereby the deceleration inference means infers the need for deceleration further with reference to the calculated distance from the current position to the specific position. The control parameter determining means may also include curvature calculating means for calculating radius of curvature of a corner ahead of the vehicle, section calculating means for calculating sectional distance from the current position to entrance to the corner, road shape inference means for inferring shape of a predetermined road section ahead of the vehicle, average curvature calculating means for calculating average curvature of one or more corners in the predetermined road section, altitude variation calculating means for calculating altitude variation in the predetermined road section, and/or standard acceleration calculating means for calculating standard acceleration of the vehicle in accordance with the detected vehicle throttle opening degree and gear ratio. In yet another embodiment, the control parameter determining means includes speed calculating means for calculating recommended vehicle speed at a predetermined position ahead of the vehicle, thereby determining the control parameter in accordance with a difference between the recommended vehicle speed and the current vehicle speed, wherein the predetermined position may be a node.

The road information may include one or more items of information selected from the group consisting of radius of curvature of a corner, road slope, distance to entrance to the corner, speed limit for the road, average curvature or average slope of a specific section on a scheduled drive route, distance to an entrance ramp of an expressway, intersection, distance to the intersection and nodes representing the road shape.

The vehicle drive condition may be a condition selected from the group consisting of vehicle speed, degree of throttle opening, gear ratio, operative condition of a cruise control unit, operation of lights, blinker operation and wiper operation.

The selected specific position may be a point of approach to a corner, an intersection, or an entrance to a freeway ramp.

The vehicle control device according to the present invention may further include first discriminating means for determining a need for restricting the shiftable range of gear ratio in accordance with the road information for a predetermined road section ahead of the vehicle, and second discriminating means for determining need for further restricting the gear ratio in accordance with the road information for a sub-section specified within the predetermined road section.

The first or second discriminating means may make its determination in accordance with at least two different types of road information.

The deceleration sensor means may detect one or more operations selected from the group consisting of switching on of a light, switching on of a blinker, switching on of a wiper, release of the accelerator pedal and stepping on the brake pedal.

DESCRIPTION OF THE PREFERRED EMBODIMENTS

The present invention will be hereinbelow described in more detail with reference to the accompanying drawings.

Figure 1:
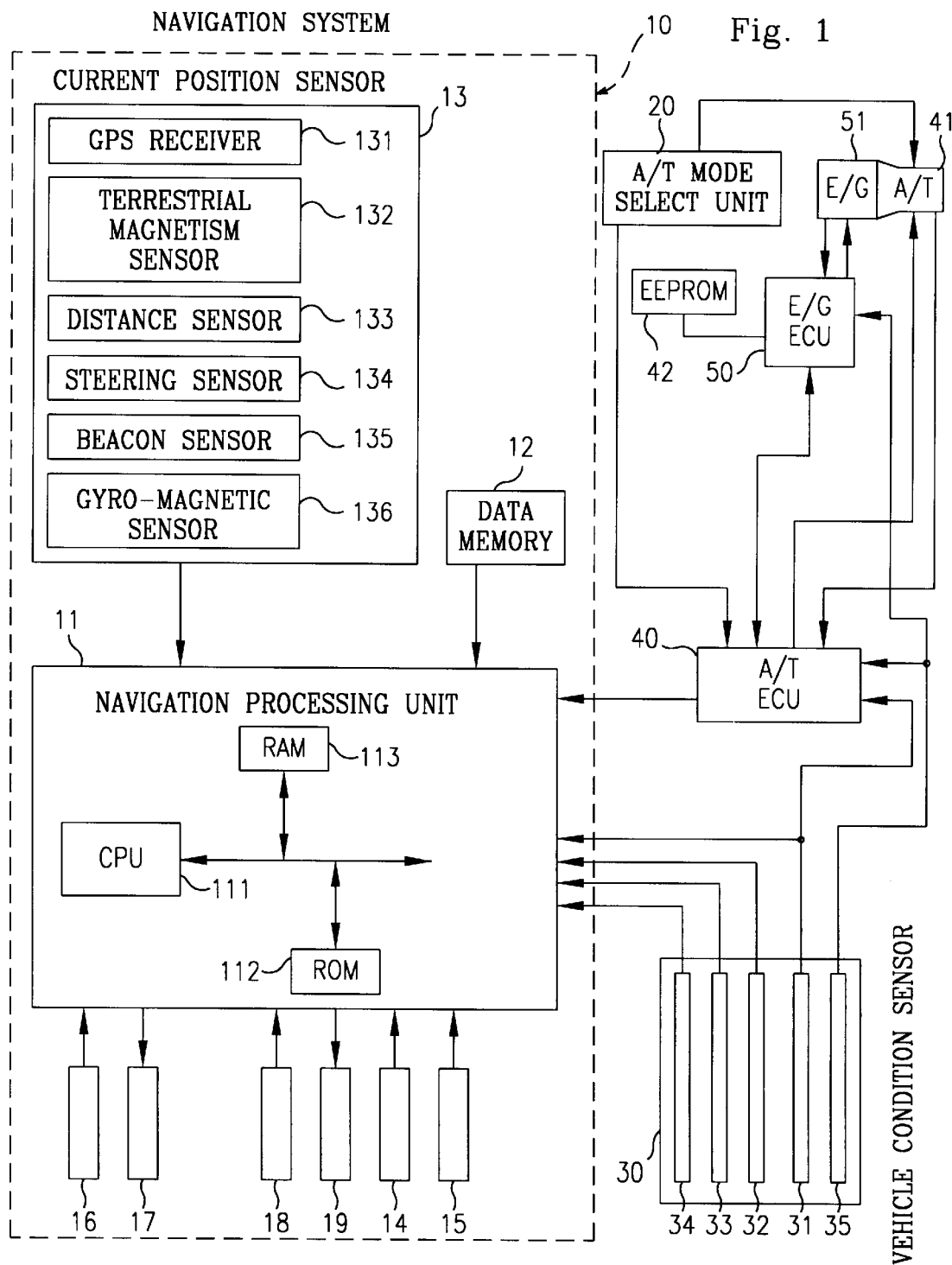
FIG. 1 is a block diagram showing a preferred embodiment of the present invention.

FIG. 1 is a block diagram showing a vehicle control device of a first embodiment of the present invention.

The vehicle control device 1 of this invention includes a navigation system 10, an automatic transmission 41, an A/T mode select unit 20 and a vehicle condition sensor 30. Navigation system 10 has a navigation processing unit 11, a data memory unit 12 that stores road information, a current position sensor 13, a select means or a control release switch 14, a communication unit 15, an input unit 16, a display unit 17, a voice input unit 18 and a voice output unit 19.

Navigation processing unit 11 has a central processing unit (CPU) 111 that operates in response to the input information to perform various data processing operations and output the results. To CPU 111 are connected ROM 112 and RAM 113 through data bus lines. ROM 112 is a read only memory storing programs for searching of a drive route to the destination, drive guidance along the drive route, and determination of a certain section on the drive route, for example. RAM 113 is a random access memory to be used as a working memory when CPU 111 performs a data processing operation.

Data memory unit 12 has a map data file, an intersection data file, a node data file, a road data file, a photograph data file and a plurality of area data files storing data of hotels, gas stations, and sightseeing spots in the respective areas. Data stored in these files is used not only for searching of a drive route, but also for providing various items of information, such as a guide map along the drive route, photographs and/or figures featuring an intersection or any places along the drive route, distance to the intersection, direction to be taken at the intersection, etc., through display 17 and/or voice output unit 19.

Among information stored in these files, the files respectively storing intersection data, node data and road data are used in main for route searching by the navigation system. These files store data regarding road width, slope or gradient, road surface condition, radius of curvature, intersection, T-shaped intersections, number of road lanes, lane-merging points, approach to a corner, railway crossings, exit ramps of expressways, tollgates, points where the road width narrows, downhill roads, uphill roads, latitude and longitude indicating absolute coordinates, altitude of absolute coordinates, absolute position and altitude of nodes on roads, etc. Road information comprises the above-described data for the detected current vehicle position, and comprises in main information for the road ahead of the current position in the direction of driving. For example, such information includes intersections positioned forward on the drive route, corners, nodes and radii of curvature in predetermined sections, distance from the current position to a predetermined point such as an intersection or to a predetermined section, etc. The road information also includes various road conditions as detected by respective sensors and obtained through communication means, etc.

Any memory device such as DVD, MO, CD-ROM, optical disk, magnetic tape, IC card and optical card may be used to store the data files. Although a CD-ROM or other memory device having great memory capacity is preferably used to store the files, an IC card may be used for other data files requiring less memory capacity.

Current position sensor 13 has a GPS receiver 131, a terrestrial magnetism sensor 132, a distance sensor 133, a steering sensor 134, a beacon sensor 135 and a gyro-magnetic sensor 136. GPS receiver 131 receives radio waves from earth satellites to determine the vehicle position. Terrestrial magnetism sensor 132 detects terrestrial magnetism to determine the direction in which the vehicle is advancing. Distance sensor 133 may be a measuring device of a type wherein the number of wheel rotations is detected followed by calculation or another type wherein acceleration is detected followed by integration twice. Steering sensor 134 is typically an optical rotation sensor or a rotation-resistant volume mounted on a rotating steering member, but may be a steering angle sensor mounted to the wheel. Beacon sensor 135 receives positional information from beacons arranged along the roads. Gyro-magnetic sensor 136 may be a gas-rate or vibration type gyro-magnetic sensor that detects a turning angle velocity of the vehicle followed by integration to determine the vehicle running direction.

GPS receiver 131 and beacon sensor 135 alone can serve to measure the vehicle position. Further, the absolute position of the vehicle may be determined by combination of a distance detected by distance sensor 133 and a direction detected by terrestrial magnetism sensor 132 and/or gyro-magnetic sensor 136, or by combination of a distance detected by distance sensor 133 and a steering angle detected by steering sensor 134.

Communication unit 15 transmits and receives data to and from FM transmission units and telephone circuits. For example, it receives data regarding road information including traffic jams and traffic accident information that are supplied from a traffic information center.

Input unit 16 is used to input any data for, for example, correction of the current position at the beginning of driving and for input of the destination. An example of input unit 16 is a touch panel arranged on a display unit 17 and adapted to input any information by a touch on a key or menu represented thereon. Another example of input unit 16 is a keyboard, a mouse, a bar code reader, a writing pen or a remote controllable input device.

Display unit 17 is used to represent, for example, guidance for operation, operation menu, operation keys, a recommended drive route to the destination determined at a user's request, and a guide map along the drive route. The display unit 17 may be a CRT display, a liquid crystal display, a plasma display or a hologram device that projects a hologram onto a front glass. Display unit 17 constitutes announcement means for providing visual information to the driver to let him or her know the contents of the transmission control.

Voice input unit 18 comprises a microphone, for example, through which necessary information can be input by voice. Voice output unit 19 has a voice synthesizing device and a speaker, thereby output the synthesized voice guide information. In addition to the synthesized voice guide information, various items of guide information recorded on a tape may also be output through the speaker. The voice guide information may be a combination of the synthesized voice and the recorded voice. The voice output unit 19 may constitute another announcement means for providing audible information to the driver to let him or her know the contents of the transmission control.

With the above-described arrangement, the navigation system operates to provide road information for the area around the vehicle current position to the driver, thereby guiding the driver along a specific route to the destination. More particularly, when the destination is input through input device 16, navigation processing unit 11 operates to selectively determine a recommended drive route to the destination, based on the vehicle current position detected by current position sensor 13 and the road information read out from data memory unit 12. The drive route is output to display unit 17. The drive route shown on display unit 17 cooperates with the voice information outputted through voice output unit 19 to lead the driver to the destination. When no destination is input, navigation processing unit 11 outputs only the road information for the area around the vehicle current position to display unit 17.

In the above-described navigation system 10, current position sensor 13 comprises the current position sensor means, and data memory unit 12 and navigation processing unit 11 cooperate with each other to constitute the road information obtaining means. A specific point positioned forward of the vehicle current position in the driving direction is determined by navigation processing unit 11, based on the current position and the driving direction of the vehicle, as determined by current position sensor 13, and the road information stored in data memory unit 12. The distance calculating means is constituted by current position sensor 13, data memory unit 12 and navigation processing unit 11.

Figure 2:
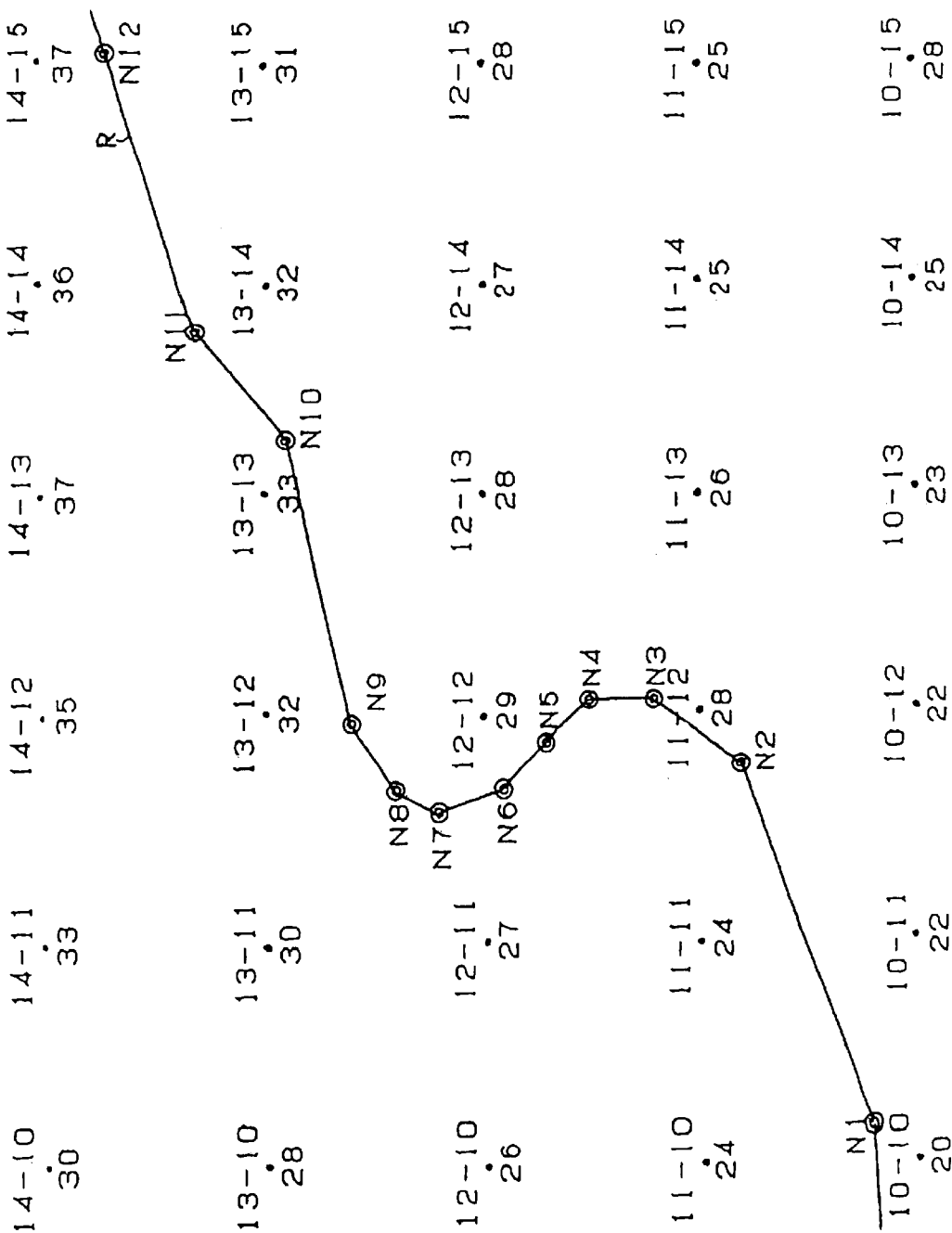
FIG. 2 is an explanatory diagram showing road data.

The road data stored in data memory unit 12 is composed of node-connecting segments. FIG. 2 is a diagram showing an example of the road data stored in data memory unit 12, wherein a solid line R shows a shape of the road. The road shape is represented by nodes (N1, N2, . . . ) and segments connected between two adjacent nodes. Each node is defined at least by its coordinates (which in this embodiment are the absolute coordinates comprising latitude and longitude).

In this embodiment, the road shape is also defined by altitude, as well as by nodes and segments. Altitude data is given to points arranged at 250-meter spacings with each other in lateral and longitudinal directions. For example, a point of (10—10) is at the altitude of 20 meters and another point of (10–11) is 22 meters, as shown in FIG. 2.

In this embodiment, the average curvature, the road slope, the altitude variation, the radius of curvature, etc., are determined by relationship between the node positions and the altitude data for the respective nodes. Although the altitude data is given for spaced points, as stated above, to minimize the data volume, it may be possible that the respective nodes have altitude data. It is also possible that each road section or segment has slope data, which is used in combination with others to determine the altitude of a specific node point.

The drive route may have been programmed in the navigation system. When no drive route has been programmed in the navigation system the drive route may be assumed to go straight.

The control parameter to be controlled in this embodiment is the gear ratio of transmission, more particularly transmission stages. The above-described navigation processing unit 11 determines a specific single transmission stage or a restricted range of stages within which the transmission is shiftable, whereby a command signal indicating the specific stage or the upper limit stage within the restricted shiftable range is output to the automatic transmission as described later. The navigation system 10 determines the actual transmission stage in response to the command signal, even if another stage is selected under the normal transmission control governed by A/T ECU 40. Thus, navigation processing unit 11 constitutes the control parameter determining means in this embodiment.

A/T mode select unit 20 is used to select a shift position and a transmission control mode. A vehicle condition sensor 30 that detects various vehicle conditions including the drive condition has vehicle speed sensor means or a vehicle speed sensor 31, decelerating operation sensor means, e.g., a brake sensor 32, an accelerator sensor 33, a blinker sensor 34, and a throttle opening sensor 35. Vehicle speed sensor 31 detects a vehicle speed V. Brake sensor 32 detects if a brake pedal is depressed (ON/OFF). Accelerator sensor 33 detects an accelerator's degree of opening α. Blinker sensor 34 detects ON/OFF of a blinker switch. Throttle opening sensor 35 detects a throttle opening degree θ.

A decelerating operation is detected as at least one of the brake ON/OFF indicating signal, accelerator's opening degree indicating signal and blinker ON/OFF indicating signal received by the navigation processing unit 11. The vehicle speed V detected by vehicle speed sensor 31 is supplied both to navigation processing unit 11 and an electric control circuit 40 to be described later. The throttle opening degree detected by throttle opening sensor 35 is supplied to electric control circuit 40.

An operation reflecting the driver's intention to decelerate may be detected as an ON brake signal. It may be possible that the degree of the brake pedal depression is detected, in which case the driver's intention to decelerate is inferred in further consideration of the detected degree of the brake pedal depression. The driver's decelerating operation may also be detected as a variation of the accelerator opening degree. More particularly, when the accelerator opening degree is very small but is still further decreased by more than a predetermined percentage (that is a percentage of a decrease in the amount of accelerator opening with respect to the previous small stepping amount of the accelerator pedal), may be utilized as an indicator that the driver intends deceleration. In summary, the driver's operation of greatly decreasing the accelerator pedal depression may be recognized as indicating an intention to decelerate and, therefore, may be detected as a decelerating operation.

An intention to decelerate may also be indicated by variation (decrease) of the accelerator opening a, variation (decrease) of vehicle speed, variation (decrease) of acceleration, etc. These parameters may be combined with the accelerator opening degree α after it is changed, to detect a decelerating operation. For example, when the vehicle is running only by inertia the accelerator opening degree α is nearly zero. Accordingly, $\alpha \approx 0$ does not always mean the driver's intention to decelerate. Thus, when there is a sufficient decrease of the accelerator opening and when the decreased accelerator opening becomes substantially zero, then it is inferred in the affirmative that the driver intends to decelerate.

The driver's intention to decelerate may also be inferred from a change of throttle opening (that is a change in engine torque). As has been described with regard to the case wherein the driver's intention to decelerate is judged based on the degree of accelerator opening, a change of the degree of throttle opening (a decrease of the throttle opening, a decrease of the vehicle speed, a decrease of deceleration) may be taken into consideration in this case.

In still another embodiment, the driver's intention to decelerate is inferred based on operation or non-operation of the brake pedal and the accelerator pedal. By way of example, the affirmative inference of the driver's decelerating operation is made when either one of stepping-on of the brake pedal and release of the accelerator pedal is detected. Alternatively, the affirmative inference of the driver's decelerating operation is made only when detecting the braking operation and lack of operation of the accelerator pedal. In this manner, the system faithfully follows the driver's intention to decelerate.

In still another embodiment, the driver's intention to decelerate is anticipated by an ON signal indicating the blinker is in operation. In this embodiment, it is preferable to further take into consideration the vehicle speed when the blinker signal is ON. For example, it could be inferred that a decelerating operation is necessary, if the vehicle speed still exceeds a predetermined speed at which the vehicle could safely enter an intersection at the time when the blinker signal becomes ON. If the vehicle speed has been lowered to below the predetermined speed at the time when the blinker signal is turned ON, it can be inferred that there is no decelerating operation.

Vehicle condition sensor unit 30 may include a light sensor that detects the turning on of headlamps, and a wiper sensor that detects operation of a wiper. The light sensor may comprise a switch operated to turn the headlamps on and off. The wiper sensor may comprise a switch for actuating the wiper. The headlamps being turned on would suggest that it has become darkened around the vehicle and, therefore, it may be considered as one of factors in inferring or anticipating the driver's intent to decelerate. The wiper in operation would suggest rainfall or snowfall which decreases the friction coefficient of the road surface and, therefore, may also be considered as a factor in inferring or anticipating the driver's intent to decelerate. In other words, turning-on of the headlamps and/or the wiper increases the need of deceleration during the succeeding driving and could be followed by the driver's positive decelerating operation (for example, stepping on the brake pedal and/or release of the accelerator pedal). Thus, consideration of these factors will facilitate the control efficiency of the present system.

The automatic transmission comprises a mechanism unit 41 (referred to by A/T in the drawings) including a gear train composed in main of planetary gears and a hydraulic circuit for engagement and dis-engagement between components of the gear train to provide multiple transmission stages, and an electric control circuit 40 (hereinbelow referred to by A/T ECU) for controlling mechanism unit 41.

Navigation system unit 10 and A/T ECU 40 are connected with each other by communication lines for mutual communication.

To A/T ECU 40 are connected vehicle speed sensor 31 and throttle opening sensor 35. A vehicle speed signal from sensor 31 and a throttle opening signal from sensor 35 are supplied to A/T ECU 40. A shift position signal indicating a shift position selected by AT mode selecting unit 20 is supplied to A/T ECU 40 from a shift position sensor (not shown) mounted to mechanism unit 41.

From A/T ECU 40 is output a drive signal to an actuator (hydraulic solenoid) in the hydraulic circuit of mechanism unit 41, in response to which the actuator operates to control the transmission stage. A/T ECU 40 is controlled by control programs stored in EEP-ROM 42. For example, the transmission stage is determined, in response to the throttle opening degree detected by throttle opening sensor 35 and the vehicle speed detected by vehicle speed sensor 31, by reference to memory tables (transmission maps). The transmission maps selectively determine a specific one of the transmission stages.

The transmission maps have been prepared separately for a normal mode and a sport mode, one of which is automatically selected in response to the transmission mode indicating signal supplied from navigation processing unit 11. The transmission mode may also be changed manually by the driver's operation of AT mode selecting unit 20.

The normal mode stores an economic drive pattern having a good balance of fuel consumption and power, which is suitably applicable to usual drive conditions. Power is a more important consideration in the sport mode which is better suited for driving in a mountain area or hill-climbing, for example.

In this embodiment, the transmission control includes determining the upper-limit of the transmission stages, i.e., prohibiting an up-shift to speed(s) higher than the determined upper-limit speed, while not changing the usual transmission maps. Accordingly, any transmission map may be utilized for normal transmission control.

A shift lever provided in AT mode selecting unit 20 has seven selectable shift positions, that is, a parking position, a reverse position, a neutral position, a drive position, a third speed position, a second speed position and a low speed position. The shift lever is mechanically connected to the shift position sensor, not shown, mounted to mechanism unit 41.

When the shift lever is in the drive position, any one of 1st to 5th gear speeds of the transmission can be selected. One of 1st to 3rd gear speeds in transmission stages is selectable in the third speed position. Either of 1st and 2nd gear speeds in the second speed position. In the low speed position only 1st gear speed is applicable. In this embodiment, navigation system 10 provides the automatic transmission control operation when the shift lever 21 is held at the drive position. For example, when A/T ECU 40 determines 4th gear speed but navigation system 11 commands that the transmission stage should be 3rd gear speed, then the drive signal commanding 3rd gear speed is supplied. When A/T ECU 40 determines 4th gear speed but navigation system 11 commands that the upper limit of the transmission stages should be 3rd gear speed, then the drive signal ranges 1st to 3rd and does not command 4th. The drive signal is supplied to actuator 41 which sets the actual transmission ratio.

As described above, navigation processing unit 11 and the automatic transmission cooperate with each other to constitute the control executing means of this embodiment. The shift position and the transmission mode signals are supplied via A/T ECU 40 to navigation processing unit 11. In a modified embodiment, navigation processing unit 11 stores in advance transmission maps of A/T ECU 40, in which case navigation processing unit 11 determines an actual transmission stage within a restricted range, with reference to the transmission map, which is then output to A/T ECU 40.

In response to the throttle opening signal from throttle opening sensor 35 and an engine revolution signal and others (coolant temperature, sensor signals, etc.) from an engine (referred to by E/G in the drawings), an engine control unit (referred to by E/G ECU in the drawings) 50 operates to control the engine 51 by regulating fuel injection, for example.

With the above-described arrangement, the transmission speed control (referred to as navigation AT control) is conducted based on the road information in the navigation system as follows.

First Embodiment

In this embodiment navigation processing unit 11 is the specific position determining means. Navigation processing unit 11 operates, in response to the road information stored in data memory 12, to determine a specific position forward in the vehicle drive direction on a scheduled drive route. It also acts as the distance calculating means to calculate a distance (d) from the current position to the specific position.

Further, navigation processing unit 11 acts as the deceleration inference means to infer a need for deceleration, in accordance with the current vehicle speed and the road information at or around the specific position. When there is a need for deceleration, navigation processing unit 11 determines a specific one of the transmission stages for the necessary deceleration, in accordance with the distance (d), the road information at or around the specific position, the current vehicle speed and the current transmission stage. In this embodiment, data used for vehicle control is the road information, and data from navigation processing unit 11 is the road data. Accordingly, the road data and the road information may be at least partly identical. The road information may be prepared and extracted from the road data.

In response to detection of release of the accelerator pedal, brake pedal operation and turning on the blinker, which are deemed symbolic of the driver's intention to decelerate, navigation processing unit 11 operates to determine a desired transmission stage, which is output to A/T ECU 40 of the automatic transmission. A/T ECU 40 preferentially adopts the selected transmission stage supplied from navigation processing unit 11 and, in turn, supplies a corresponding drive signal to actuator 42 for shift change to the selected transmission stage. Thus, navigation processing unit 11 and A/T ECU 40 cooperate with each other to constitute the executing means.

Figure 3:
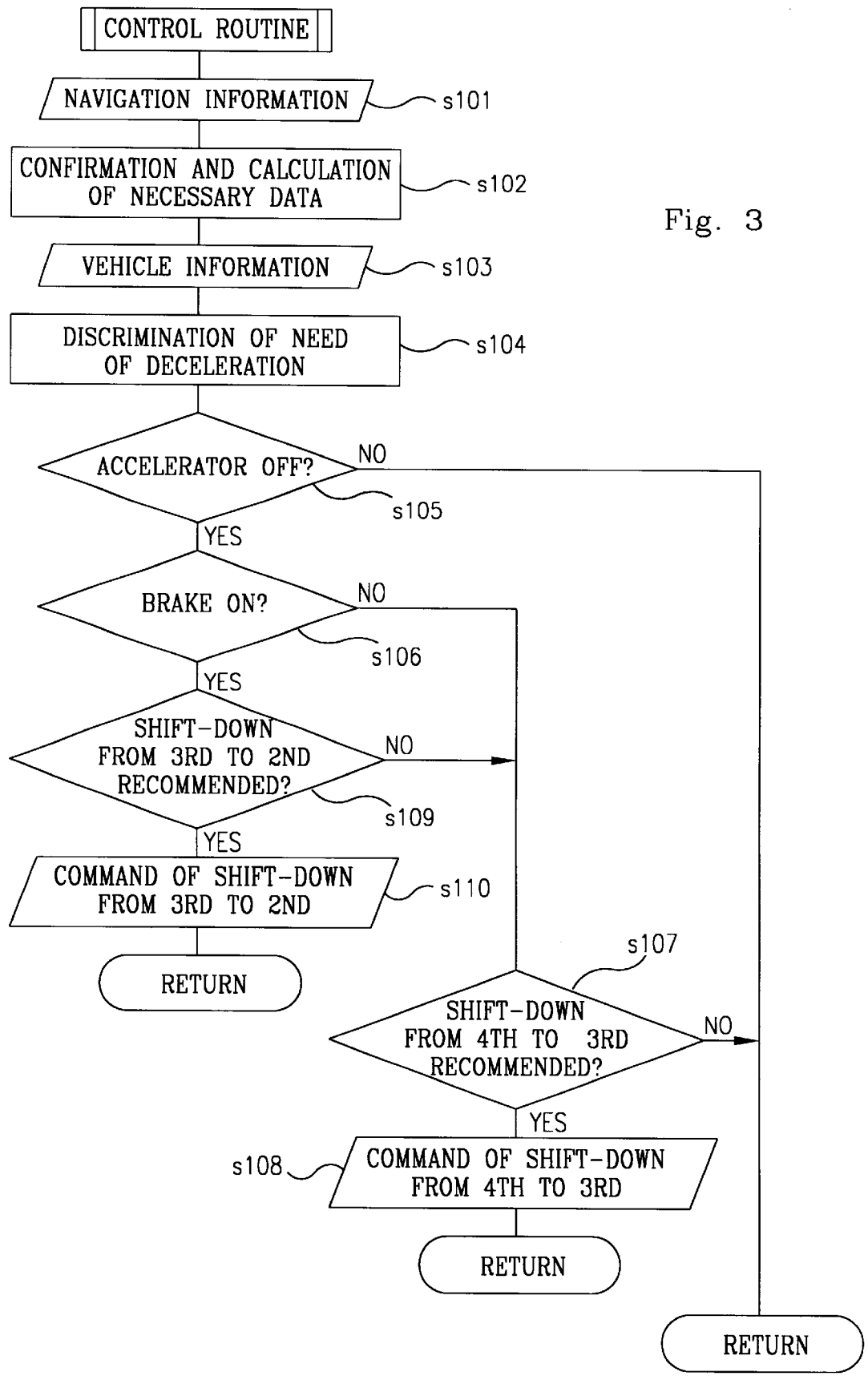
FIG. 3 is a flowchart showing the control routine of the first embodiment.

Detailed explanation of the control operation conducted by navigation processing unit 11, as the control parameter determining means, will be given hereinbelow with reference to the flowchart of FIG. 3. The flowchart of FIG. 3 shows the control operation when a curve or corner of the road is detected as a specific point, and the road information to be acquired comprises a radius of curvature, continuity of the curve, radius variation in the curve and length of the curve.

Figure 4:
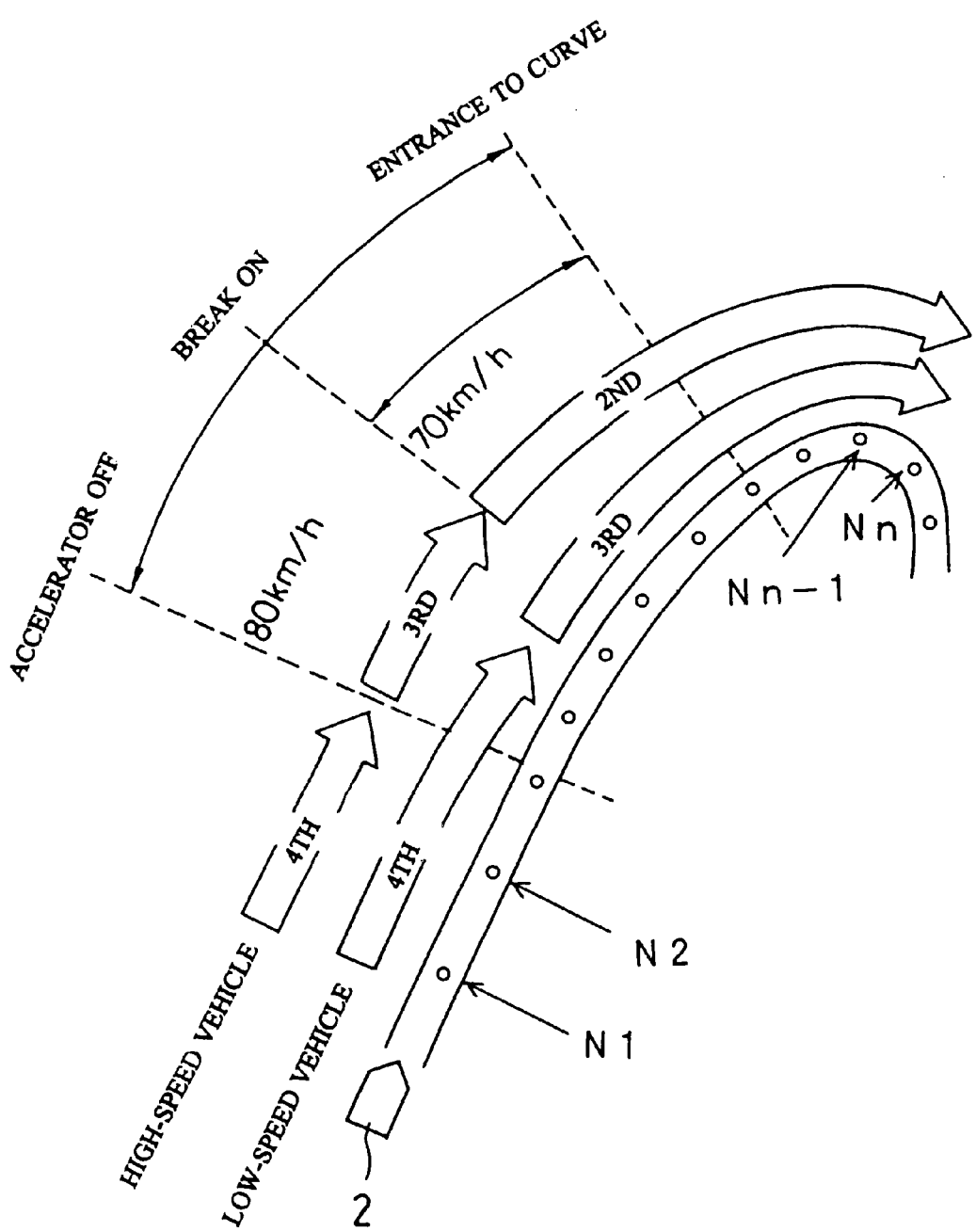
FIG. 4 is a diagram showing the relationship between vehicle position and transmission speed under control in accordance with the first embodiment.

First, navigation processing unit 11 acquires the current position of the vehicle 2 and the road data forward in the drive direction, at step S101. The road data forward in the drive direction includes a classification or type of the road, shape of the road ahead, and coordinate data of the respective nodes N1-Nn ahead of the current vehicle position, such as shown in FIG. 4.

Based on data acquired at S101, a radius of curvature, continuity of the curve, a radius variation of the curve and a length of the curve are calculated to acquire the road information. More particularly, a radius of curvature at a specific node is determined by an angle between two adjacent segments connected to the said node. From radii of curvature at respective nodes, continuity of the curve and a radius variation of the curve may be determined. A distance (d) from the current position to the curve is also calculated, at step S102.

Next, the drive condition corresponding to vehicle information is acquired, at step S103. The vehicle information includes a vehicle speed V, a degree of opening of the accelerator α and a brake signal. Based on the vehicle information and the road condition previously obtained at S102, navigation processing unit 11 determines if the vehicle speed should be decreased, at step S104.

In determining a need for deceleration, navigation processing unit 11 first determines an appropriate speed at which the vehicle can drive along the curve with good stability, with reference to the detected nature or shape of the curve. From the appropriate speed and the distance (d) to the curve is determined the necessary deceleration which, in turn, determines the degree of slowdown and necessity for a down-shift.

Even if the necessity for a down-shift is determined in the affirmative, down-shift control is not actually performed at this stage. In the next step, the driver's decelerating operation is confirmed. In this step, release of the accelerator pedal and stepping-on the brake pedal are considered as provisional parameters suggesting the driver's intention to decelerate. First, it is determined if the accelerator pedal is released, at step S105. When the accelerator pedal is stepped on (NO at S105), it is determined that the driver does not intend to decelerate, in which case no down-shift control is carried out, to follow the driver's intention, and the routine is returned to the beginning and resumed through S101–S104.

If the accelerator pedal is released (YES at S105), then it is determined if the brake pedal is stepped on, at step S106. If not (NO at S106), it is determined if a down-shift from 4th gear speed to 3rd gear speed is needed, at step S107. This determination is carried out based on the results already obtained at S104. For example, when the vehicle is running at a relatively low speed and there is a sufficient distance to the entrance of the curve, it is inferred that there is no need for deceleration and no need of a down-shift (NO at S107), in which case the routine is returned to the beginning. Even when the vehicle is running at a relatively low speed, if distance (d) to the entrance of the curve is relatively short, it may be inferred that there is a need for deceleration and down-shift (YES at S107), in which case a corresponding signal commanding a down-shift of 4th gear speed to 3rd gear speed is output to A/T ECU 40, at step S108.

When the brake pedal is stepped on (YES at S106), it is determined if a down-shift from 3rd to 2nd is necessary, at step S109. This determination is also based on the results already obtained at S104. For example, when the vehicle is running at a relatively low speed, it is determined that no down-shift is necessary (NO at S109) and the routine is advanced to S107 where it is determined if the current transmission stage is 3rd or lower gear speed.

When the vehicle is running at a relatively high speed, it is determined that a down-shift from 3rd to 2nd gear speed is necessary (YES at S109) and a drive signal commanding 2nd gear speed is output to A/T ECU 40 for down-shift from 3rd to 2nd gear speed at step S110.

As described hereinabove, even if there is an error in detecting the vehicle position, the down-shift control begins in response to the driver's decelerating operation, so that it is possible to automatically down-shift the transmission stage at a suitable time, when the driver intends to do so, and at a suitable vehicle position, which facilitates smooth driving at an appropriate speed.

Next, the control operation for when an intersection is detected as a specific point will be described. In this case, the road classification, the road shape forward of the current position, the number of roads at the intersection, the width of the roads at the intersection, the number of lanes and angles between the roads at the intersection, etc., have been selected as the road information.

Figure 5:
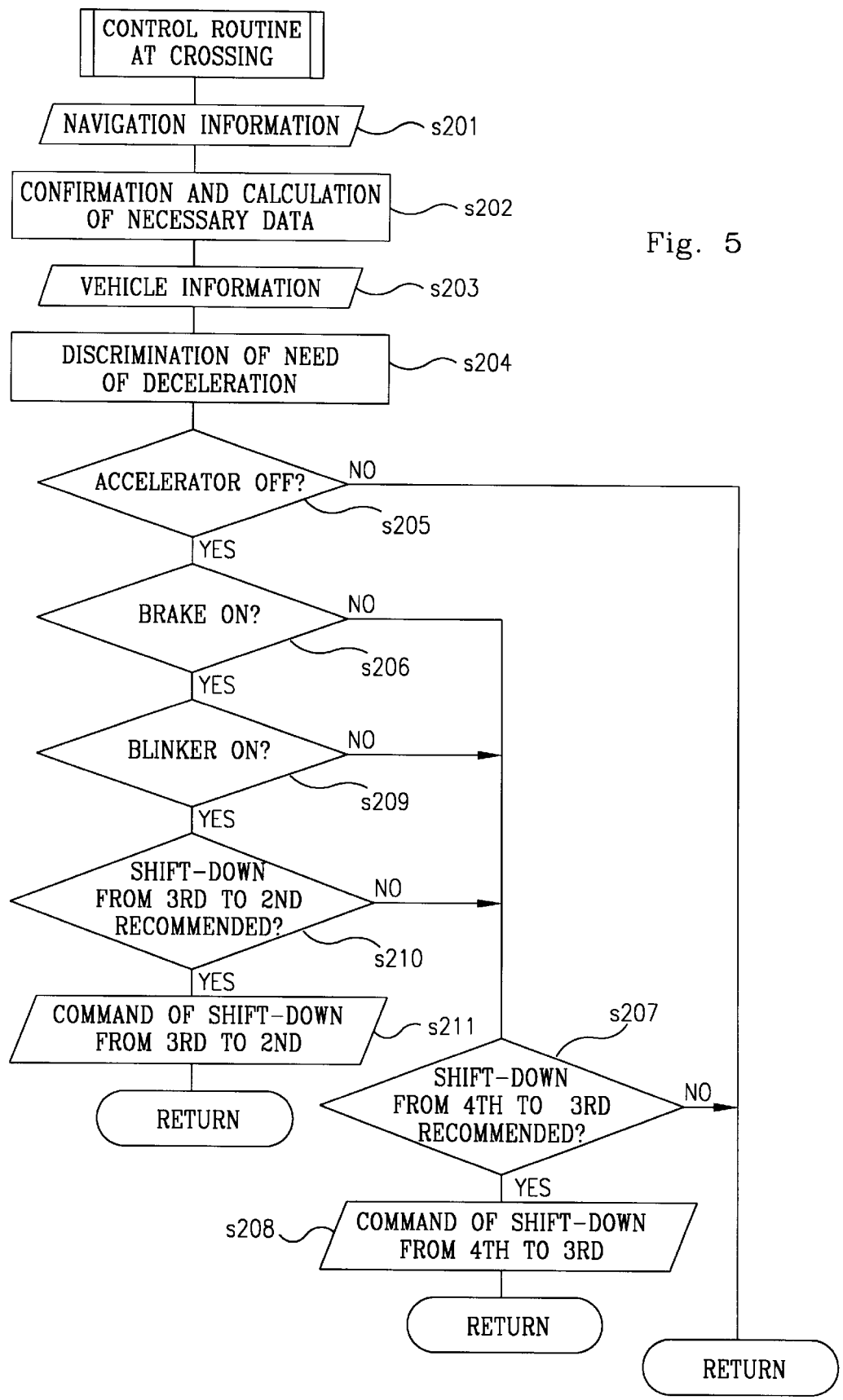
FIG. 5 is a flowchart showing a control routine of the first embodiment for an intersection.

Now, with reference to the flowchart of FIG. 5 and FIG. 6, the control for when the vehicle is passing through the intersection will be explained hereinbelow.

First, navigation processing unit 11 acquires the current position data, data of the road forward in the drive direction and other necessary data, at step S201. The forward road data includes the road type, the forward road shape, the number of roads crossing at the intersection, the width of the crossing roads, the number of lanes, etc.

Figure 6:
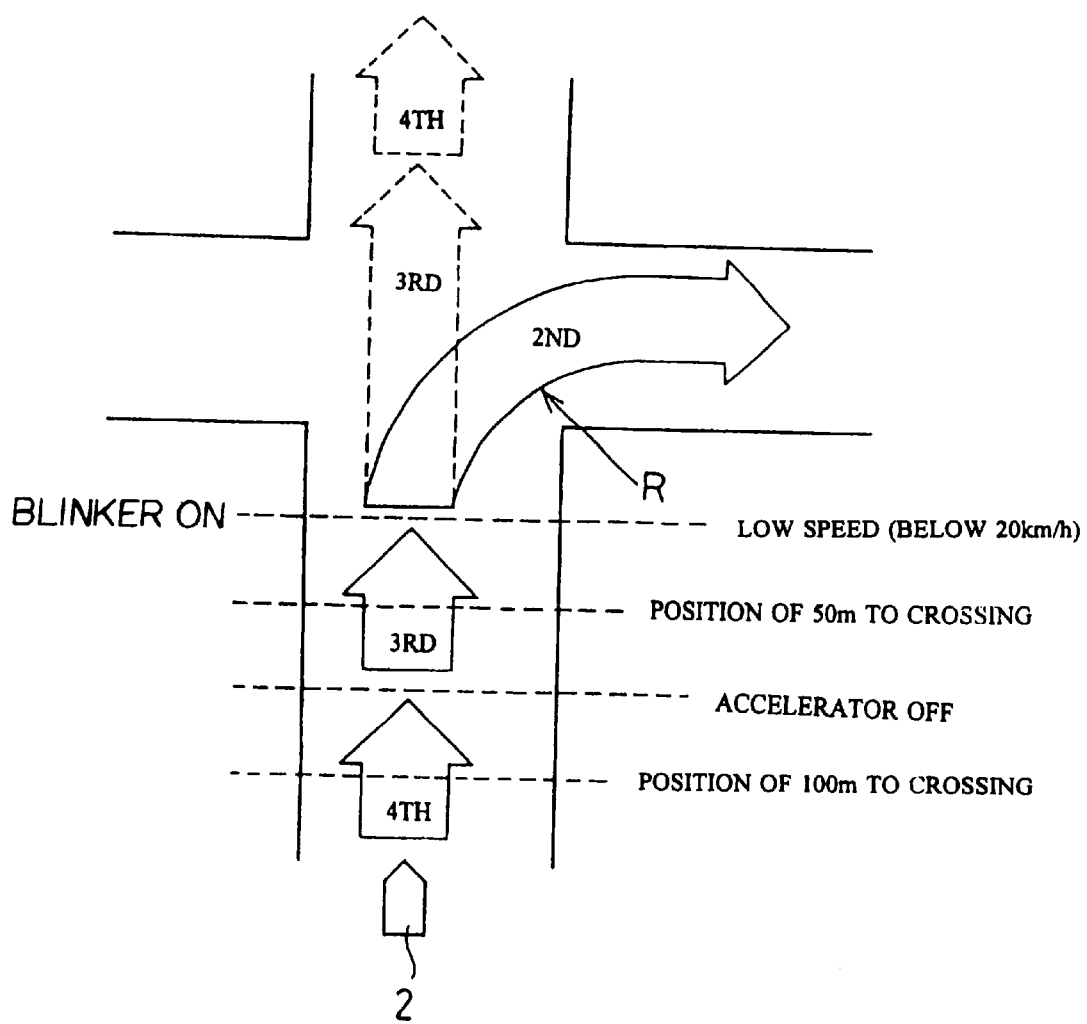
FIG. 6 is a diagram showing an example of an intersection and control therein.

From data stored in S201, it acquires the road information regarding a radius of curvature R in turning (to the right) at the intersection, see FIG. 6. From this data, it calculates a vehicle speed that is deemed appropriate for making the turn at the intersection. It also calculates a distance (d) from the current position to the intersection. These operations are carried out in step S202.

Next, the vehicle information is acquired at step S203. The vehicle information includes a vehicle speed V, a degree of opening of the accelerator α, a brake signal, etc. Based on the vehicle information and the appropriate vehicle speed that has been calculated at S202, it determines if there is a need for decelerating the vehicle speed before entering the intersection, at step S204.

A need for decelerating the vehicle speed is determined in the following manner. An appropriate vehicle speed for making a turn at the intersection is determined in accordance with the previously acquired data, including the radius of curvature R in making the turn at the intersection, the width of the road which the vehicle enters by making the turn at the intersection, the number of lanes and the angles between the roads before and after the turn. Then, from the current vehicle position and the distance (d) to the intersection is determined a necessary deceleration which, in turn, determines a degree of slowdown and necessity for a down-shift.

Down-shift control is not performed at this stage. In the next step, the driver's decelerating operation is confirmed.

First, it is determined if the accelerator pedal is released, at step S205. When the accelerator pedal is stepped on (NO at S205), it can be inferred that the driver does not intend to decelerate, in which case no down-shift control is carried out, thus following the driver's intention, and the routine is returned to the beginning and resumed through S201–S204. For example, in FIG. 6, the driver is still stepping on the accelerator pedal to some extent at a position of 100 meters to the intersection, and on this basis it can be assumed that the driver does not intend to decelerate the vehicle speed in entering the intersection. In this case, such a driver's intention is indicated and no control is carried out for the down-shift from 4th to 3rd. The vehicle will run straight through the intersection, without making a turn.

If the accelerator pedal is released (YES at S205), then it is determined if the brake pedal is stepped on, at step S206. If not (NO at S206), it is determined if a down-shift from 4th to 3rd is needed, at step S207. This determination is carried out based on the results already obtained at S204. More particularly, when the vehicle is running at a high speed, there would be an increased need of deceleration. When it has been determined that there is a need of deceleration at S207, the down-shift control from 4th to 3rd speed is carried out in response to release of the accelerator pedal, at step S208. When the vehicle is running at a low speed, there is a decreased need of deceleration. If it has been determined that there is no need of deceleration at S207, it is decided that it is not necessary to down-shift the transmission speed from 4th to 3rd (NO at S208), in which case the routine is returned to the beginning.

When the brake pedal is stepped on (YES at S206), it is then determined if the blinker is turned on, at step S209. If not (NO at S209), the procedure advances to step S207. More particularly, when the blinker is not turned on, even if the brake pedal is depressed, the driver's intention could not be confirmed as to whether or not to make a turn at the crossing. If the blinker continues to be inoperative even when the vehicle reaches to a position in vicinity to the crossing, it is thereby determined that the driver's intention is not to make a turn but to keep straight on, which suggests no need for the down-shift control from 3rd to 2nd to be carried out at S210. Rather, it is determined at S207 if there is a need for the down-shift from 4th to 3rd.

On the other hand, when the blinker is turned on (YES at S209), it is supposed that the driver's intention is to make a turn at the crossing and, therefore, it is determined if it is necessary to down-shift the transmission from 3rd to 2nd speed, at step S210. This determination is carried out also based on the results already obtained in S204. When, for example, it is determined that the driver intends to decelerate the vehicle speed or make a turn at the crossing in response to operation of the blinker, the down-shift control begins to decelerate the vehicle speed to the appropriate speed (say 20 km/hour) that has been determined at S202.

When it is inferred that the down-shift control is necessary at S210, a corresponding signal is output to carry out the down-shift control from 3rd to 2nd speed at step S211. If not, the routine returns to the beginning.

As described hereinabove, even if there is an error in detecting the current vehicle position, the down-shift control begins in response to the driver's decelerating operation, so that it is possible to automatically down-shift the transmission stage at a suitable timing when the driver intends to do so, and at a suitable vehicle position, which facilitates smooth driving at an appropriate speed and turning at the crossing.

Figure 7:
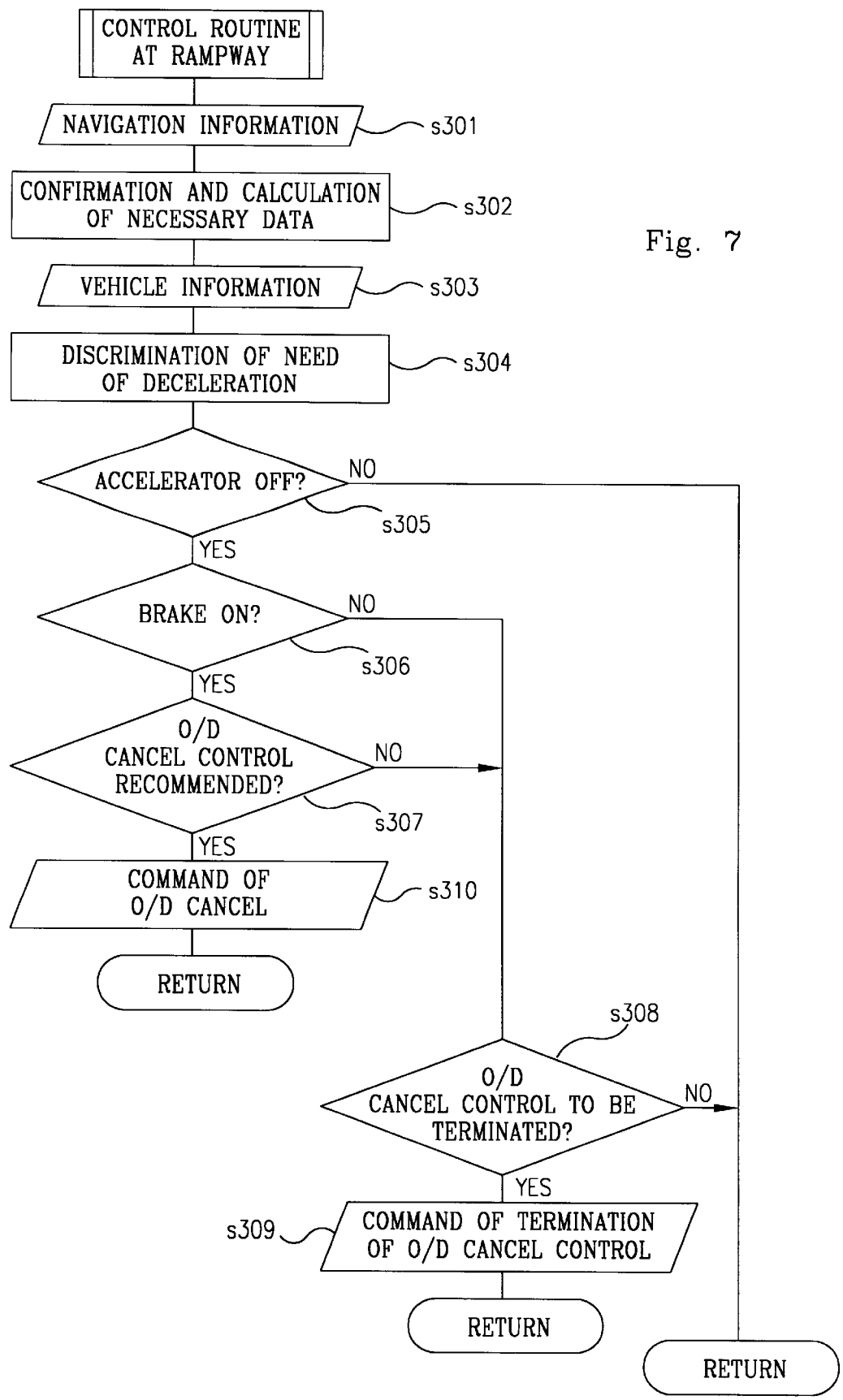
FIG. 7 is a flowchart showing a control routine of the first embodiment for approaching a ramp.
Figure 8:
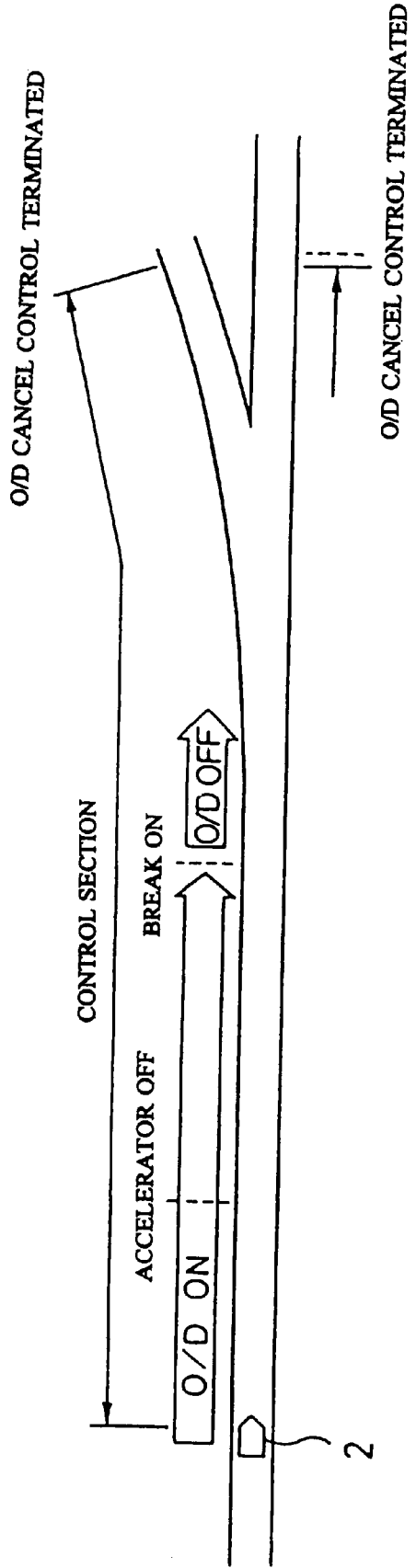
FIG. 8 is a diagram showing an example of approach to an expressway ramp and control therein.

Next, the control operation to be carried out when a rampway to a freeway road is detected as a specific point will be described hereinbelow. In this case, the road classification, the speed limit, position of the rampway, the road shape forward of the current position, the width of the road, the number of lanes, etc., have been selected as the road information. Now, the control operation will be described, with reference to the flowchart of FIG. 7 and FIG. 8, for when the vehicle is to enter the rampway to the freeway road.

Navigation processing unit 11 first acquires the current position data and the road data regarding the freeway road, at step S301. The road data regarding the freeway forward of the current position includes the road classification, position of the rampway, the shape of the road ahead, the width of the road and the number of lanes.

From the data obtained at S301, position of the ramp to enter, entry to the rampway and a predetermined control section to the entrance to the rampway are confirmed at step S302. At this step a distance (d) from the current position to the entrance to the rampway, which is a specific position in this embodiment, is also calculated. The shift-change control operation is carried out when the vehicle is within the control section which is determined in advance to extend over a predetermined distance in advance of the entrance to the rampway.

Next, the vehicle information is acquired at step S303. The vehicle information includes the vehicle speed V, the degree of opening of the accelerator α and the brake signal. Based on the vehicle information and the road condition that has been determined at S302, it is determined if the vehicle current position is within the control section and if the vehicle speed exceeds a predetermined speed. For example, when the current vehicle position is out of the control section, it is inferred that there is no need for deceleration. Even when the current position is within the control section, when the vehicle speed exceeds a predetermined speed, say 120 km/hour, it is inferred that the vehicle is not to enter the rampway and, therefore, there is no need for deceleration at step S304.

When the current position is within the control section and the vehicle speed is lower than a predetermined speed, then it is inferred in the affirmative that deceleration is needed, in which case the procedure enters an overdrive control routine for compulsorily making overdrive inoperative in the automatic transmission. The overdrive control is carried out after confirming the driver's decelerating operation at steps S305 and S306. More particularly, when a drive route has already been determined by navigation system 10 so that a rampway to be entered has also been determined, it is determined at S305 if the driver has released the accelerator pedal. When the accelerator pedal is still depressed which suggests that the driver does not intend to slow down, it is inferred at S308 that it is not necessary to cancel the overdrive, in which case the routine returns to the beginning for resuming S301–S304.

When confirming that the accelerator pedal is released (YES at S305), it is then determined at step S306 if the brake pedal is depressed. If not (NO at S306), the procedure is returned to the beginning. When the brake pedal is actuated, it is then determined at step S307 if the overdrive cancelling control is needed. When it has been confirmed at S304 that there is a need for deceleration, it is determined at S307 that the overdrive cancelling control should be carried out, so that a corresponding command is supplied for cancellation of the overdrive at step S310, even if the overdrive position is selected by the driver. For example, in a vehicle having a 4-gear speed automatic transmission, an up-shift to 4th gear speed would be prohibited.

When the accelerator pedal is depressed, when the brake pedal is released or when the vehicle has passed through the control section, NO is obtained as an answer at S305–S307 respectively, and it is then determined if the overdrive cancelling control should be terminated, at step S308. At S308, the need for termination of the overdrive cancelling control is judged based on the inference at S304. When the current position is out of the control section or when the vehicle speed reaches or exceeds a predetermined speed, a command for termination of the overdrive cancelling control is output at step S309. If it is determined that it is not necessary to terminate the overdrive cancelling control, the routine is returned.

As described hereinabove, even if there is an error in detection of the current vehicle position, the overdrive cancelling control begins in response to the driver's decelerating operation, so that it is possible to automatically slow down the vehicle speed at a suitable time corresponding to when the driver intends to do so, and at a suitable vehicle position, which facilitates smooth entry to the rampway at an appropriate speed.

If a drive route has not yet been determined, after inferring a need for deceleration at S304, it is determined if the blinker is in operation. When the blinker is not in operation, it may be inferred that the driver intends to go straight, without entering the rampway, so that the overdrive cancelling operation is not carried out and the routine is returned. When the blinker is turned on, it is determined at S305 if the accelerator pedal is released. After that, the control is carried out in the same manner as in the above-described case wherein the drive route is predetermined.

Figure 9:
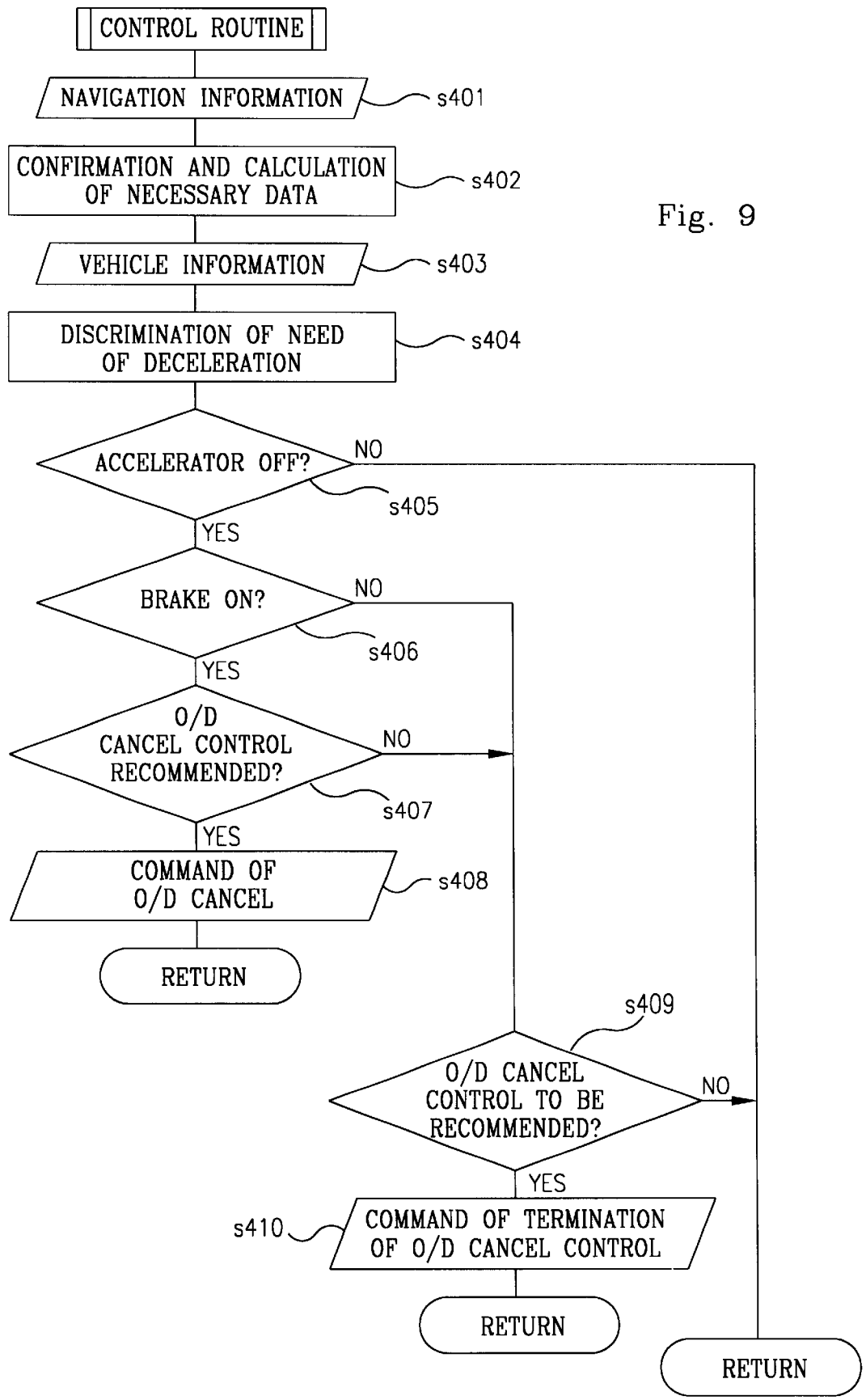
FIG. 9 is a flowchart showing the control routine of the first embodiment.

Next, the control operation will be described for when a downhill is detected as a specific point. In this case, the road classification, the speed limit on the road, the forward road shape, the road width, the number of lanes, the node data of the road, etc. are selected as the road information. Now the control operation to be carried out when the vehicle enters the downhill will be described hereinbelow, with reference to the flowchart of FIG. 9.

Navigation processing unit 11 first obtains the current position data and the road data regarding the road forward in the driving direction, at step S401. The forward road data includes the road type, the forward road shape, the road width and the number of lanes.

From the data obtained at S401, including the forward road shape, the road width, altitude data for points on or around the road, the node altitude data, etc., an altitude variation in a designated section is calculated, at step S402. The designated section is a section having an altitude variation larger than a predetermined standard.

At step S403 is obtained the vehicle information including the vehicle speed V, the degree of opening of the accelerator α and brake signal. Based on the vehicle information and the road condition that has been confirmed at S402, it is determined if the vehicle is now running downhill, and if that is the case, it is determined if deceleration is needed in accordance with the vehicle speed and the altitude variation at step S404. A higher speed and a greater altitude difference (slope) will tend to increase the need for deceleration.

When the need for deceleration is determined in the affirmative, the procedure enters the overdrive cancelling control. At this stage, however, the overdrive cancelling control is not yet actually carried out, and the driver's intention to decelerate is confirmed at steps S405 and S406.

First, it is determined at step S405 if the driver has released the accelerator pedal. When the accelerator pedal is still depressed, which suggests that the driver does not intend to decelerate the vehicle, it is inferred at step S408 that it is not necessary to cancel the overdrive, in which case the routine is returned to the beginning for resuming steps S401–S404.

When confirming that the accelerator pedal is released (YES at S405), it is then determined at step S406 if the brake pedal is depressed. If not (NO at S406), the routine is returned to the beginning. When the brake pedal is actuated, it is then determined at step S407 if the overdrive cancelling control is needed. When it has been confirmed at S404 that there is a need for deceleration, it is inferred at S407 that the overdrive cancelling control should be carried out, so that a corresponding command is supplied for cancellation of the overdrive at step S408, even if the overdrive position is selected by the driver. For example, if the vehicle has a 5-gear speed automatic transmission, an up-shift to 5th gear speed is prohibited.

When the accelerator pedal is depressed, when the brake pedal is released or when it has been determined at S404 that there is no need for deceleration, NO is obtained as an answer at S405–S407 respectively, and it is then determined at step S409 if the overdrive cancelling control should be terminated. At S409, the need for termination of the overdrive cancelling control is judged based on the inference at S404. When the vehicle speed is sufficiently low or when the altitude variation of the road becomes small, a command for termination of the overdrive cancelling control is output at step S410. When, for example, the driver releases both the brake pedal and the accelerator pedal, it may be inferred that there is no need to terminate the overdrive cancelling control, in which case the routine is returned.

As described hereinabove, even if there is an error in detection of the current vehicle position, the overdrive cancelling control begins in response to the driver's decelerating operation, so that it is possible to automatically slow down the vehicle speed at suitable timing for when the driver intends to do so, and at a suitable vehicle position, which facilitates smooth driving downhill at an appropriate speed and prevents overload of the brake system.

In accordance with the above-described vehicle control device embodying the present invention, a need for deceleration is inferred in advance based on the road information on the scheduled drive route so as to determine how the transmission is to be controlled. Accordingly, the decelerating control can be practiced in quick response to the driver's decelerating operation. Further, since the control begins with the driver's operation, the transmission shift change is carried out at a suitable timing which conforms to the driver's intention.

Moreover, if the decelerating control is made adjustable depending on a calculated distance from the current position to the specific position, smoother decelerating control may be achieved.

Most preferably, the decelerating control is initiated in response to an operation by the driver indicating an intention to decelerate, for example releasing the accelerator, depression of the brake pedal and actuation of the blinker. By such control, a shift-change for deceleration is carried out at a suitable timing and at a suitable position, in accordance with the driver's intention.

Second Embodiment

In this embodiment means for calculating a radius of curvature comprises a data memory 12, a current position sensor 13 and a navigation processing unit 11. Navigation processing unit 11 determines specific turning points positioned forward of the current position, based on the current position and the running direction of the vehicle detected by current position sensor 13 and the road information stored in data memory 12. Section calculating means comprises current position sensor 13, data memory 12 and navigation processing unit 11. The turning points to be determined by navigation processing unit 11 include intersections, T-shaped intersections, points where the number of lanes decreases, curves and corners, entrances to the curve or corner, rampways to the freeway, points where the road width narrows, and other points where the vehicle should change a steering angle and thus change its driving direction. Where a radius of the node connecting line exceeds a predetermined value, a beginning and an end of that portion are determined to be an entrance and an exit of the curve or corner. Thus, the section calculating means determines radius variation based on the road information stored in data memory 12 to determine the entrance to the curve, and then calculates a distance (d) from the current position to the determined entrance to the curve.

In accordance with three parameters, that is, the vehicle speed, the radius of curvature and the distance (d), navigation processing unit 11 restricts the shiftable range of the transmission stages. More specifically, navigation processing unit 11 determines the upper-limit stage to which the transmission is shiftable during control by the vehicle control device of this embodiment, and outputs a command signal designating the upper-limit speed to A/T ECU 40. A/T ECU 40 controls the transmission so that it is shiftable within a restricted range of speeds, not allowing gear-change to any speed higher than the determined upper-limit stage, based on predetermined transmission maps. For example, even if 4th gear speed should be selected in accordance with the ordinary transmission maps, when the command signal designates 3rd gear speed as the shiftable upper-limit stage, A/T ECU 40 outputs a drive signal for a range of 1st to 3rd gear stages to actuator 42. The upper-limit transmission stage is determined in accordance with control transmission maps shown in FIGS. 10–12 and data tables of the following Tables 1 and 2.

TABLE I

| Radius of Curvature | Vehicle Speed V (km/hour) | | | |
| --- | --- | --- | --- | --- |
| | 0–V1 | V1–V2 | V2–V3 | V3–V4 |
| r3–r4 | A1 | A2 | A3 | A4 |
| r2–r3 | B1 | B2 | B3 | B4 |
| r1–r2 | C1 | C2 | C3 | C4 |
| 0–r1 | D1 | D2 | D3 | D4 |

The vehicle speed has four predetermined ranges, that is, 0-V1, V1–V2, V2–V3 and V3–V4 (V1<V2<V3<V4), and the range in which the current vehicle speed falls is determined. Likewise, a radius of curvature has four predetermined ranges that is, 0-r1, r1–r2, r2–r3 and r3–r4 (r1<r2<r3<r4), and the range in which the turning point ahead falls is determined. From the combination of the vehicle speed range and the radius of curvature range a velocity-curvature coefficient is determined from Table 1.

TABLE 2

| Velocity-Curvature Coefficient | Distance d (km) | | | |
| --- | --- | --- | --- | --- |
| | 0–D1 | D1–D2 | D2–D3 | D3–D4 |
| A1 | a1 | a2 | a3 | a4 |
| A2 | b1 | b2 | b3 | b4 |
| A3 | c1 | c2 | c3 | c4 |
| A4 | d1 | d2 | d3 | d4 |

The distance (d) from the vehicle current position to the entrance to the turning point has four ranges, that is, 0-D1, D1–D2, D2–D3 and D3–D4 (D1<D2<D3<D4), and it is determined which range applies. Thus, as shown in Table 2, the upper-limit transmission stage (a1–a4, b1–b4, c1–c4, d1–d4, . . . in Table 2) is determined by combination of the velocity-curvature coefficient A1–A4, B1–B4, C1–C4, D1–D4 that has been determined in Table 1 and the distance range. Examples of such transmission control maps are shown in FIGS. 10–12.

Figure 10:
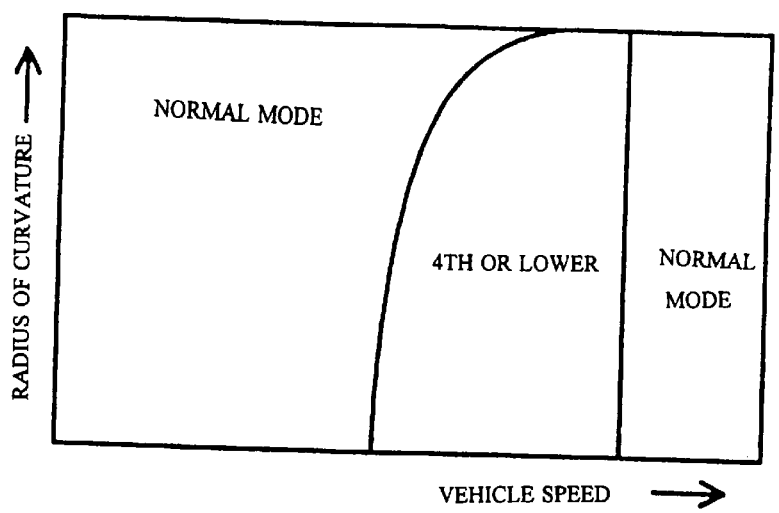
FIG. 10 is a transmission control map to be used for control in accordance with the second embodiment.
Figure 11:
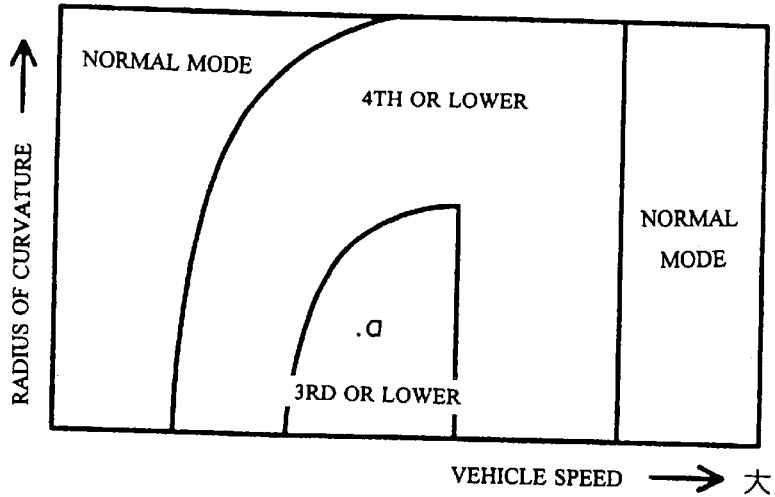
FIG. 11 is another transmission control map used in control in accordance with the second embodiment.
Figure 12:
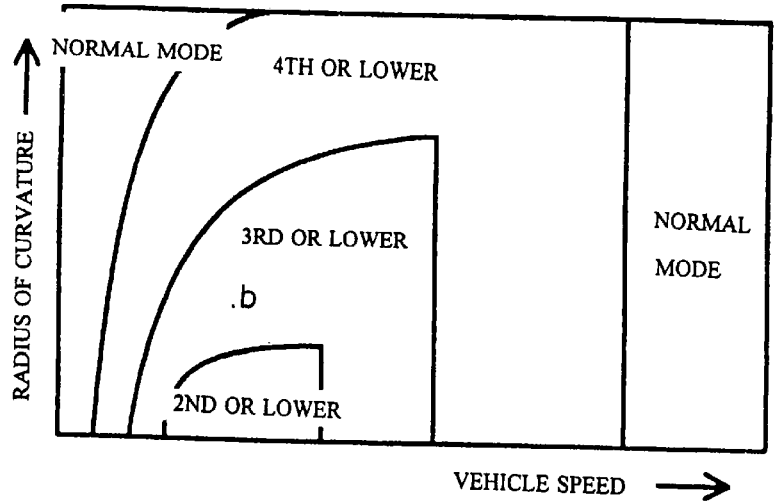
FIG. 12 is still another transmission control map used in control in accordance with the second embodiment.

FIG. 10 shows a map applicable when the distance (d) is within the long-distance range (when there is a relatively long distance to the entrance of the turning point), FIG. 12 shows a map applicable when the distance (d) is within the short-distance range (when there is a relatively short distance to the entrance of the turning point), and FIG. 11 shows a map applicable when the distance (d) is within a middle range between the long-distance range and the short-distance range.

For example, where the relationship between the radius of curvature and the vehicle speed is plotted at a point (a) in FIG. 11, even if 4th gear speed has been selected in a normal control operation by the relationship between the vehicle speed and the degree of throttle opening, the automatic transmission is controlled such that the transmission stage is only selectable within the limited range of 1st to 3rd, and in this particular case the 3rd gear speed is selected. In another example, where the relationship between the radius of curvature and the vehicle speed is plotted at a point (b) in FIG. 12, the transmission stage is actually selectable within a limited range of 1st to 3rd. When 2nd speed has been selected by the relationship between the vehicle speed and the degree of throttle opening in accordance with the ordinary transmission maps, since this speed is within the limited range, it remains unchanged. Although hysteresis is omitted from the maps of FIGS. 10–12 for easier understanding, it is preferable to provide hysteresis to prevent hunting.

Figure 13:
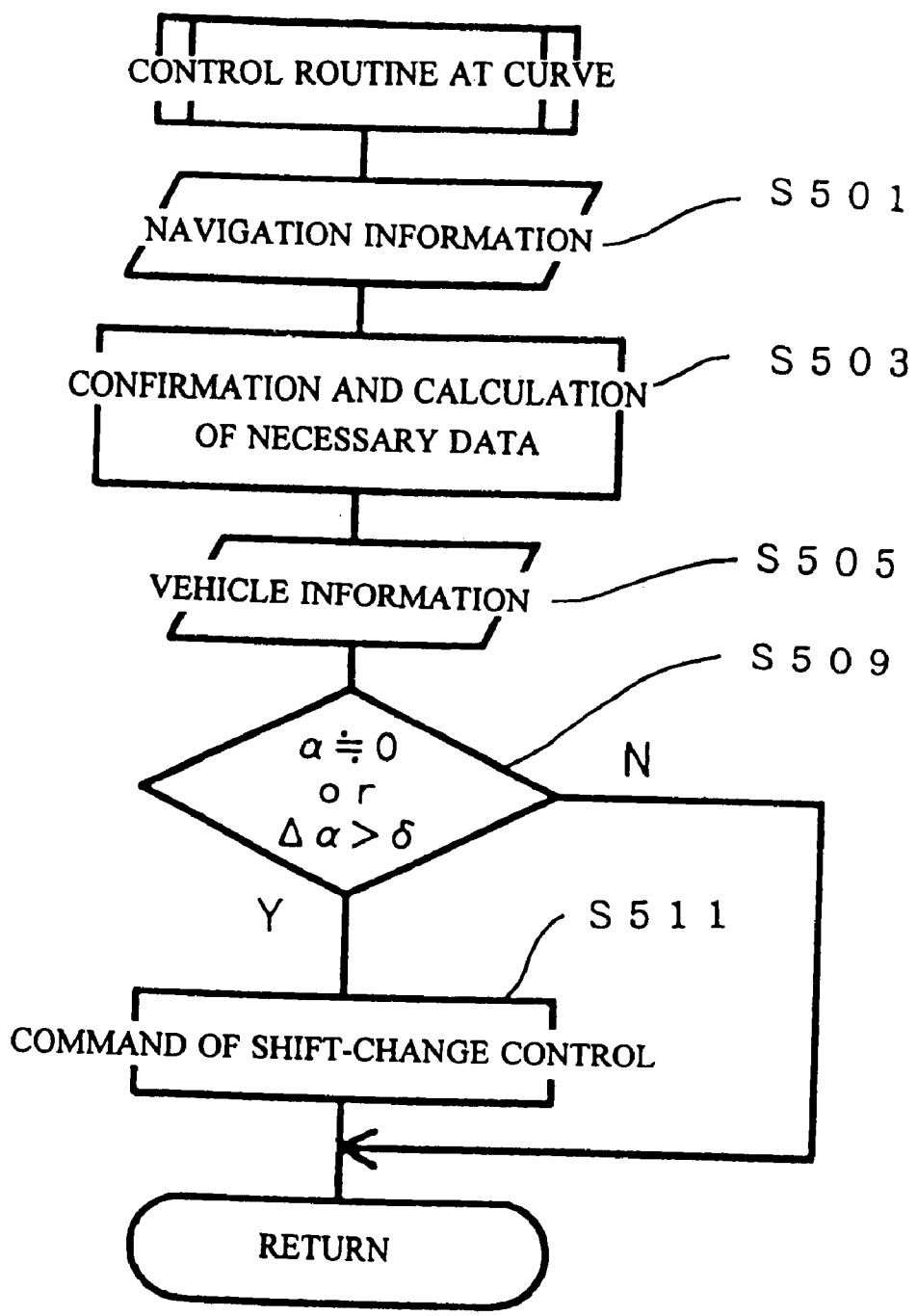
FIG. 13 is a flowchart showing a control routine for negotiating a curve in the second embodiment.
Figure 14:
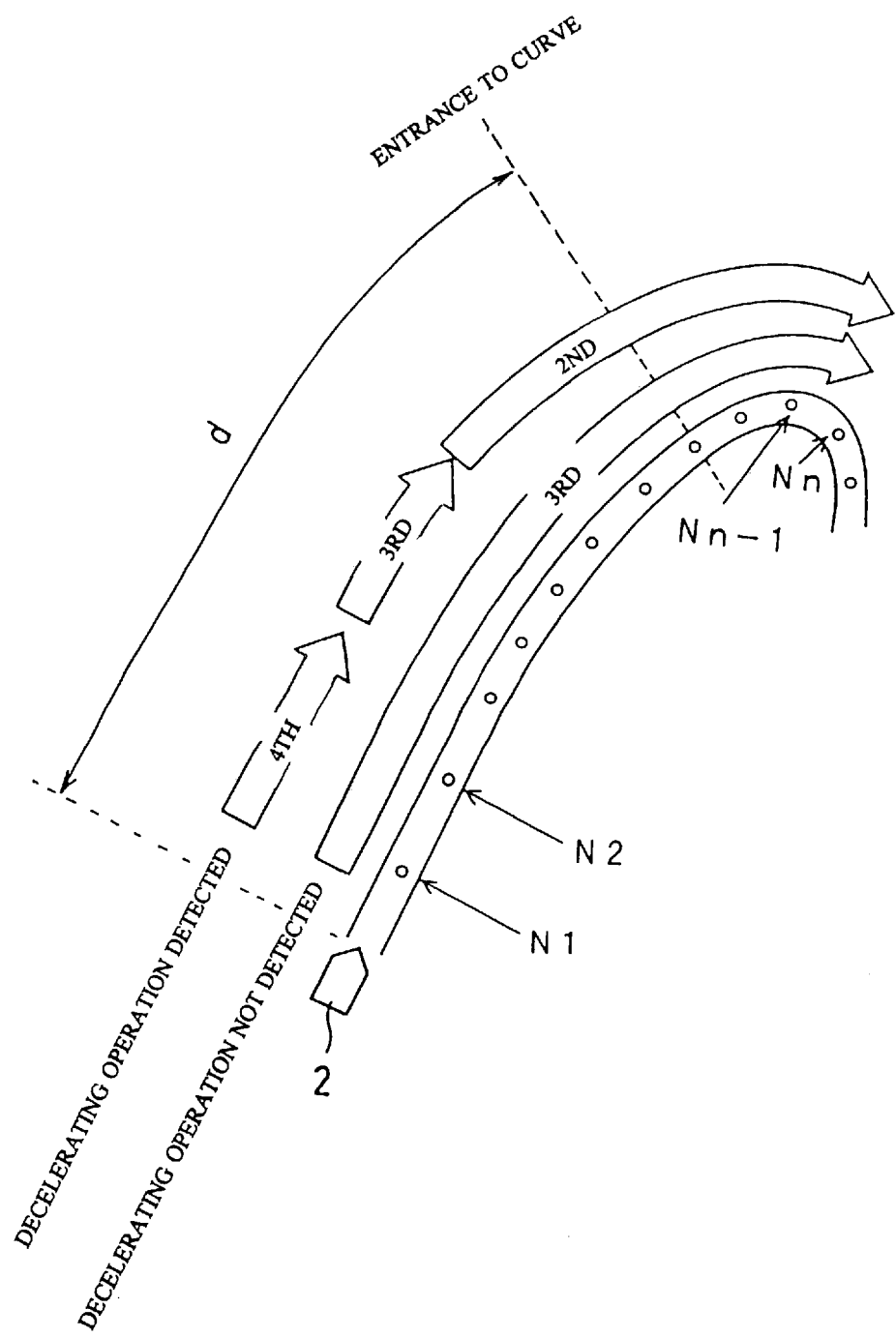
FIG. 14 is a diagram showing the relationship between vehicle position and transmission speed under control.

The control operation of navigation processing unit 11 will be described hereinbelow with reference to the flowchart of FIG. 13 which illustrates the control operation to be carried out when the vehicle is to enter the curve shown in FIG. 14.

First, navigation processing unit 11 acquires the current position of the vehicle 2 and the road information ahead of the current position at step S501. The road information ahead of the current position includes the road classification, the shape of the road ahead, and the coordinate data for the respective nodes N1-Nn positioned ahead of the current position.

From the data acquired at S501, the radius of curvature, continuity, radius variation and length of the curve are calculated and confirmed at step S503. More particularly, a radius of a node connecting line is measured at each of the nodes, which are connected in series, to determine the continuity of the curve and the variation of the radius of curvature. Further, the distance (d) from the current position to the entrance to the curve is calculated. The operation at S503 is function of the curvature calculating means and the section calculating means.

Next, at step S505 the vehicle information is obtained including the vehicle speed V, the degree of throttle opening, the degree of accelerator opening α and the brake signal. Next, the decelerating operation sensor means determines the driver's intention at step S509. For example, it is determined if the degree of accelerator opening has become almost zero, or if the degree of accelerator opening has decreased by a predetermined percentage Δα a while the degree of accelerator opening is sufficiently small.

When the degree of accelerator opening has become almost zero, or when the degree of accelerator opening has decreased by a predetermined variation percentage Δα while the degree of accelerator opening is sufficiently small, it can be inferred that the driver intends to slow down the vehicle.

When the driver's decelerating intention is confirmed, the control operation is carried out with reference to the control transmission maps. The control transmission maps set the upper limit of the shiftable transmission stages in consideration of the vehicle speed, the distance (d) to the entrance to the curve and the radius of curvature. The control operation carried out with reference to the control transmission maps is a function of the control parameter determining means. The control transmission maps are prepared so as to allow for selections of the gear speed most appropriate for conforming to the driver's decelerating intention. A command designating the upper limit or the highest transmission stage, which has been determined with reference to the control transmission maps, is supplied to the A/T ECU 40 at step S511. When A/T ECU 40 receives a command signal designating 3rd gear speed as the upper-limit shiftable transmission stage, it outputs a drive signal for driving at 3rd-gear speed, even if the ordinary transmission map designates 4th-speed drive. When, in another example, the ordinary transmission map designates 2nd-speed drive, a command signal designating 3rd gear speed as the upper-limit shiftable transmission stage allows gear-change within a range of 1st to 3rd gear speeds, and a drive signal for 2nd-speed drive is output from A/T ECU 40.

The operation carried out at steps S509 and S511 is a function of the executing means.

When the driver's decelerating intention can not be confirmed, the ordinary transmission control is carried out. In such ordinary control, it is possible that navigation processing unit 11 may determine the transmission speed in accordance with the ordinary transmission map. Alternatively, operations of S501–S511 may be effected by A/T ECU 40.

As has been described, with the vehicle control device of the present invention, the transmission speed is determined in response to the driver's driving operation, which provides the vehicle control in conformity with the driver's intention.

Third Embodiment

In this embodiment, data memory 12, current position sensor 13 and navigation processing unit 11 cooperate with each other to form the road shape inferring means. Navigation processing unit 11 determines a predetermined section ahead of the current position in the vehicle drive direction, based on the current position and the vehicle running direction, both detected by current position sensor 13, and on road information stored in data memory 12. The predetermined section means a section from the current position to another position remote by a predetermined distance (1 km, for example) from the current position in the vehicle drive direction. The distance of the predetermined section may be changed depending on vehicle speed. For example, it may be relatively short when a vehicle is running at a relatively low speed and relatively long during high speed driving. The predetermined section is set along the scheduled drive route.

Navigation processing unit 11 also manages first control for determining an average curvature Θ of the predetermined section and second control for determining an altitude variation H of the predetermined section.

1 First Control

In managing the first control, data memory 12 and navigation processing unit 11 cooperate with each other to constitute average curvature calculating means. Navigation processing unit 11 uses the road data of navigation system 10 to determine if the predetermined section is a winding road and to calculate its average curvature Θ.

Figure 15:
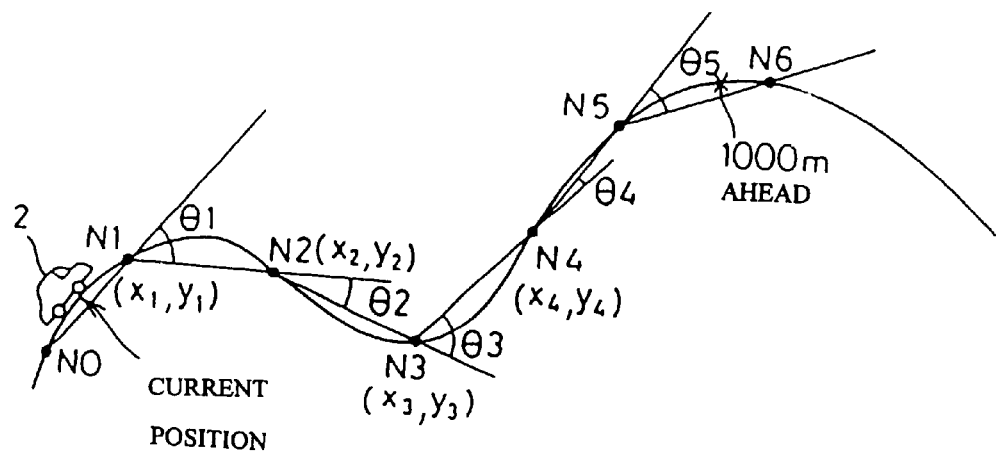
FIG. 15 is an explanatory diagram explaining calculation of average curvature of a winding road section.

FIG. 15 is an explanatory view illustrating how to determine an average curvature e of a winding road or freeway.

As shown, each road is represented as a series of segments connecting between nodes that are pre-arranged along the road at predetermined intervals. An average curvature Θ is determined in the following manner.

First, an angle θn between two adjacent segments is determined at each node. More particularly, an angle between a segment connecting a preceding node N(n−1) and a node Nn and an adjacent segment connecting the node Nn and a following node N(n+1) is determined as an angle θn at the node Nn.

In like manner, angles θ1-θn at nodes N(n−1) to Nn located within a predetermined section (of 1 km, for example) along the road, ahead of the current position in the drive direction, are determined. An average curvature Θ is determined from the following equation (1).

$$\Theta = (\Sigma |\theta n|)/n \qquad \ldots (1)$$

2 Second Control

In managing the second control, data memory 12 and navigation processing unit 11 cooperate with each other and constitute altitude variation calculating means. Navigation processing unit 11 uses the altitude data of navigation system 10 to determine a slope variation for a road on which the vehicle is to run.

Figure 16:
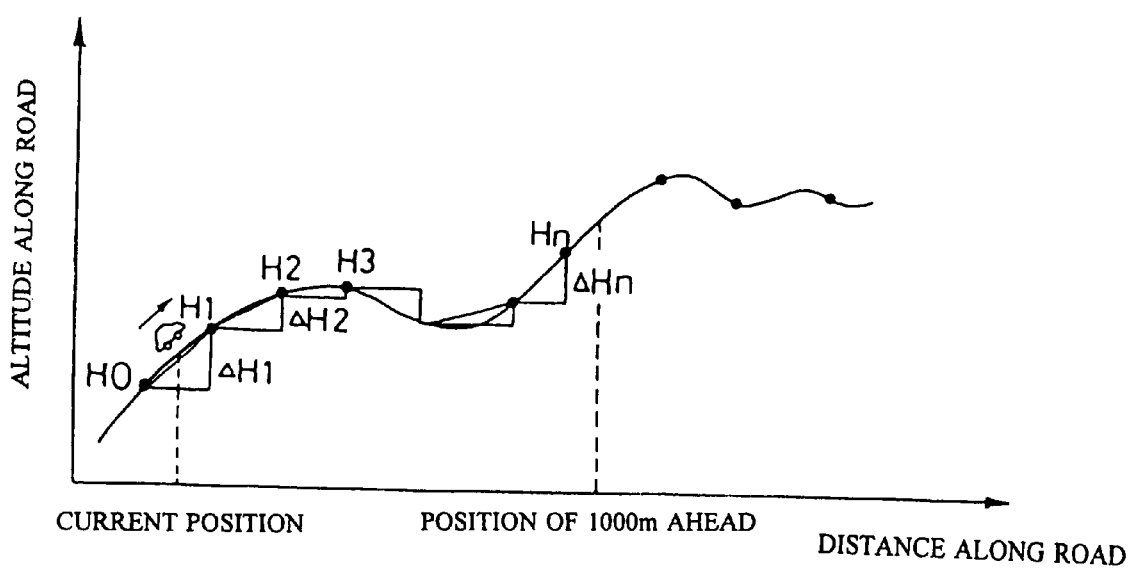
FIG. 16 is an explanatory diagram explaining calculation of altitude variation along a mountain road section.

FIG. 16 is an explanatory view showing how to determine an altitude variation H for the predetermined section. In this determination, an altitude difference ΔH of the road is considered as a slope.

The altitude variation H is determined from the altitude data of nodes on the road. First, the altitude difference ΔH between each two adjacent nodes on the road is determined from the altitude data for the respective nodes. More particularly, an altitude difference ΔH at a node Nn is an altitude difference Hn-H(n−1) between an altitude H(n−1) of a node N(n−1) and another altitude Hn of a succeeding node Nn. In like manner, altitude differences ΔH1-ΔHn are determined from the altitude data of nodes H0-Hn. An altitude variation H is determined from the following equation (2).

$$H = (\Sigma |\Delta H|)/n \qquad \ldots (2)$$

The navigation processing unit 11 determines a shiftable range or the highest transmission stage under control, from the average curvature Θ and the vehicle speed. The highest gear speed is determined from the control transmission map shown in FIG. 17. A signal indicating the highest speed is outputted to A/T ECU 40 which controls the automatic transmission within the shiftable range, not allowing operation beyond the highest speed. In the transmission control map of FIG. 17, a control area that prohibits a shift-change beyond 3rd or 4th gear speed becomes wider as the driving speed increases, and with an increase of the average curvature Θ.

This transmission control map has been prepared from the view point of determining which one of the transmission stages should be selected when decelerating the vehicle speed. However, it is determined that the driver does not desire a slow-down when the vehicle speed exceeds a predetermined value. This means that the transmission control map does not provide the above-described highest gear speed control when the vehicle is running at a speed greater than the predetermined value. In other words, the transmission control map has an area where the driver is allowed to drive under normal transmission control.

For example, when the average curvature Θ and the vehicle speed V specify a point (a), even when driving in 4th gear speed, the transmission is compulsorily down-shifted to 3rd gear speed, and during the succeeding driving the transmission control is within 1st to 3rd gear speeds, not allowing up-shift to 4th gear speed. On the other hand, when point (b) is applicable, it is determined that the driver does not intend to decelerate and no highest-speed control is provided.

Figure 18:
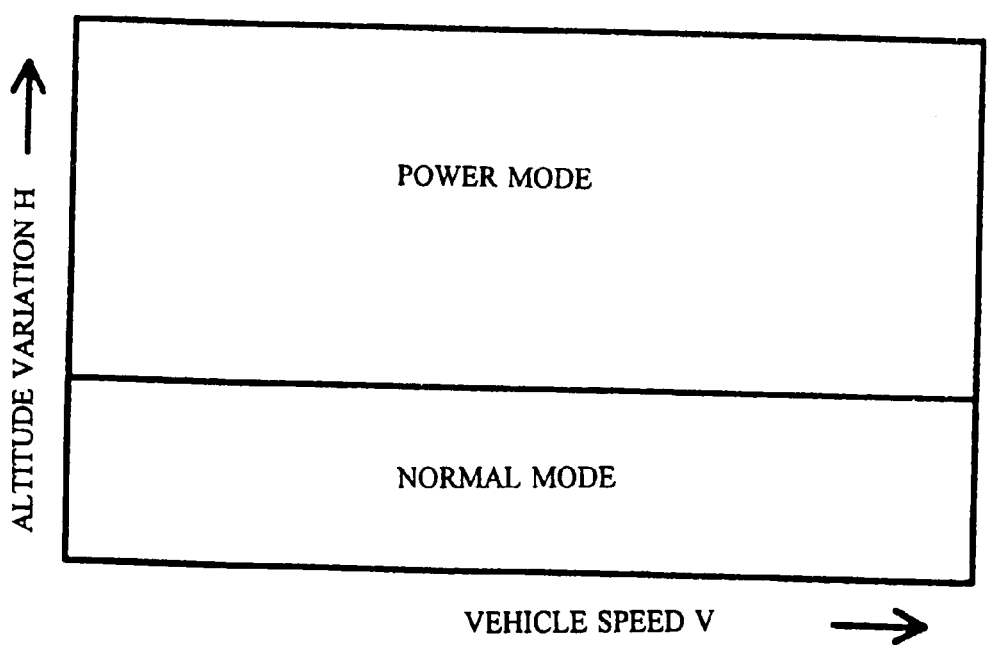
FIG. 18 is another transmission map for use in transmission mode switch control that is carried out in response to the altitude variation in the third embodiment.

When the altitude variation H is greater than a predetermined standard value (10 meters, for example), a signal is supplied for changing the transmission mode at A/T ECU 40. For example, when the altitude variation H is greater than a predetermined standard value, the transmission control mode is changed from the normal mode to the power mode. Driving with the power mode assists deceleration by providing a greater engine brake when driving downhill, whereas higher power is provided when driving uphill. When the altitude variation H becomes smaller than a predetermined standard value, the transmission map in A/T ECU 40 is changed from the power mode to the normal mode in accordance with a map shown in FIG. 18.

As has been described the navigation processing unit 11 of this embodiment determines the highest transmission stage from the average curvature Θ and the vehicle speed V, and A/T ECU 40 compares the determined highest transmission stage with a transmission stage selected in accordance with the transmission map to determine a drive signal to be output to actuator 42.

Figure 19:
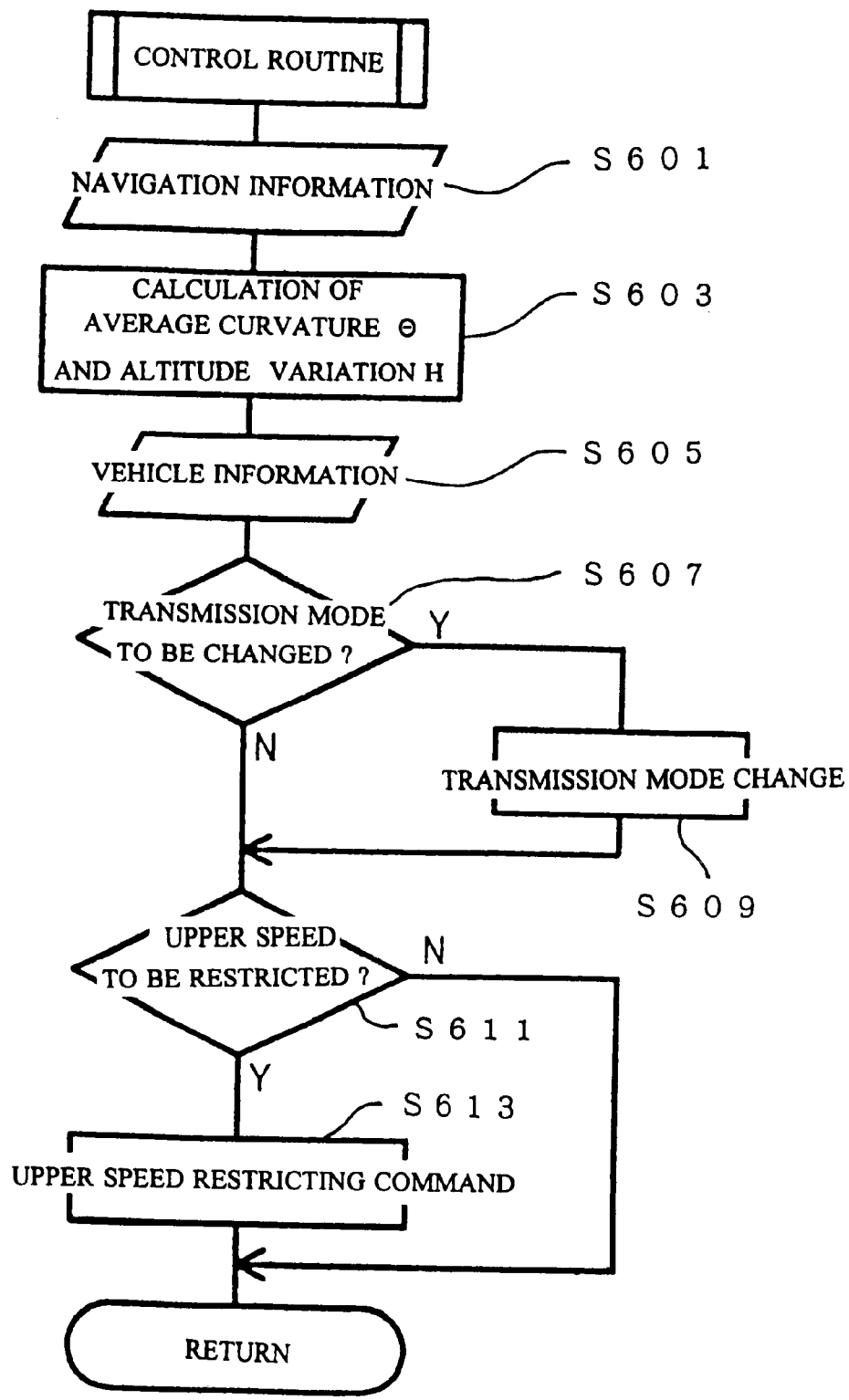
FIG. 19 is a flowchart showing the control routine of the third embodiment.
Figure 20:
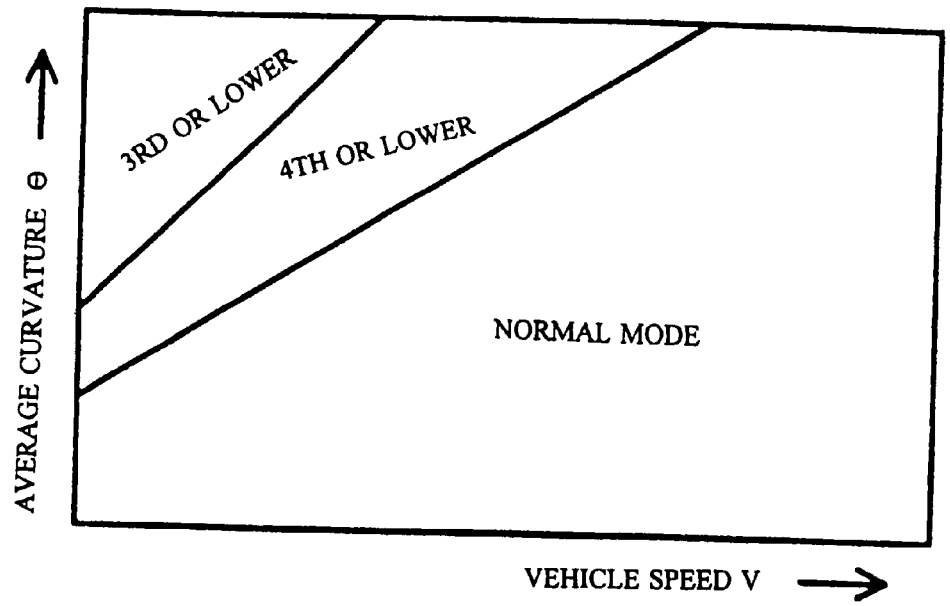
FIG. 20 is still another transmission control map for use in control in accordance with the third embodiment.

Control operation of navigation processing unit 11 will now be described with reference to the flowchart shown in FIG. 19.

First, navigation processing unit 11 acquires the current position data of the vehicle 2 and the forward road data, at step S601. Forward road data includes data indicating type of road, shape of the road, and coordinates and altitude of respective nodes plotted forward of the current position.

From the road data including the forward road shape and node data forward of the current position which have been obtained at S601, navigation processing unit 11 determines the average curvature Θ and the vehicle speed V in accordance with the equations (1) and (2), at step S603. At S603, navigation processing unit 11 functions as a road shape discriminating means which comprises, in this embodiment, average curvature calculating means and altitude variation calculating means.

Next the control routine acquires the vehicle information, at step S605. The vehicle information includes a vehicle speed V, a throttle opening, a shift position, a transmission speed and a transmission mode.

The routine then determines if there is a need to change the transmission control mode, which depends on the altitude variation H. More particularly, in accordance with the map shown in FIG. 18, it determines if the altitude variation H determined at S603 exceeds a standard value and thus determines if it is necessary to change the transmission control mode at step S607. When it is determined that the altitude variation H exceeds a standard value (YES at S607), it outputs a switch signal for changing the transmission control mode of A/T ECU 40 to the power mode at step S609. If it is below a standard value, the current transmission mode remains unchanged.

Figure 17:
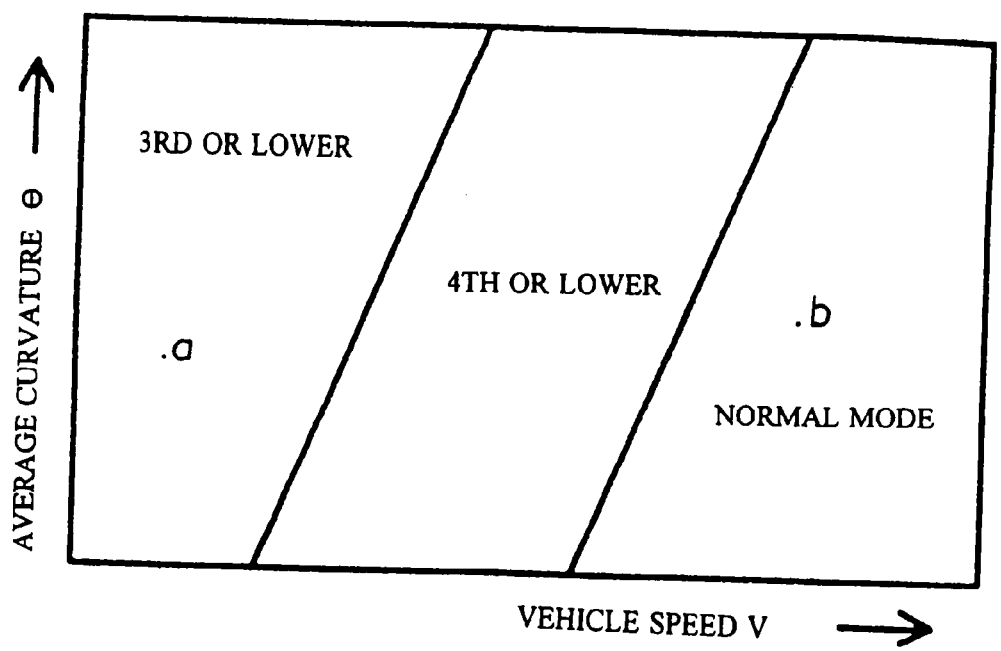
FIG. 17 is a transmission control map used in control in accordance with the third embodiment.

Then, the relationship between the average curvature Θ and the vehicle speed V, both obtained at S603, is plotted on the control transmission map shown in FIG. 17, for determining if the upper transmission speed should be restricted, at step S611. When the vehicle speed is relatively high, indicating a point (b) on the map, for example, navigation processing unit 11 determines that the driver has no intention of decelerating the vehicle NO at S611), in which case no upper-limit transmission stage control is carried out and the procedure is returned to the main routine. In this case, the vehicle is driven under the transmission mode (that is the normal mode in FIG. 17) that is now selected by the driver.

In another example, where the relationship indicates a point (a) in the map, the transmission is controlled such that it is shiftable within a range of 1st to 3rd speeds. In this case, it is determined that the upper-limit transmission stage control should be carried out (YES at S611) and a command signal indicating the upper-limit transmission stage is output to A/T ECU 40 at step S613. Thus, the transmission speed is shiftable between 1st to 3rd gear speeds. If the current speed is 4th, it is automatically shifted down to 3rd to assist deceleration. Operation at steps S603 and S607–S611 is a function of the control means. Navigation processing unit 11 functioning at step S613 and A/T ECU 40 constitute the actuating means.

With the above-described control, it is possible to smoothly drive on a winding road by preventing unnecessary and unfavorable up-shifting. This control, however, allows the driver to freely and satisfactorily drive the vehicle, when he or she wishes to do so, by releasing the upper-limit transmission speed control.

The above-described control operation may be carried out solely by navigation processing unit 11 or A/T ECU 40. More specifically, in one embodiment, transmission stage selection with reference to the transmission map and upper-limit transmission stage control are carried out by navigation processing unit 11, which outputs a signal indicating the upper-limit transmission speed to A/T ECU 40. In a modified embodiment, the road information is obtained from navigation system device 10 and operations at S603–S613 are all carried out by the A/T ECU 40.

Figure 21:
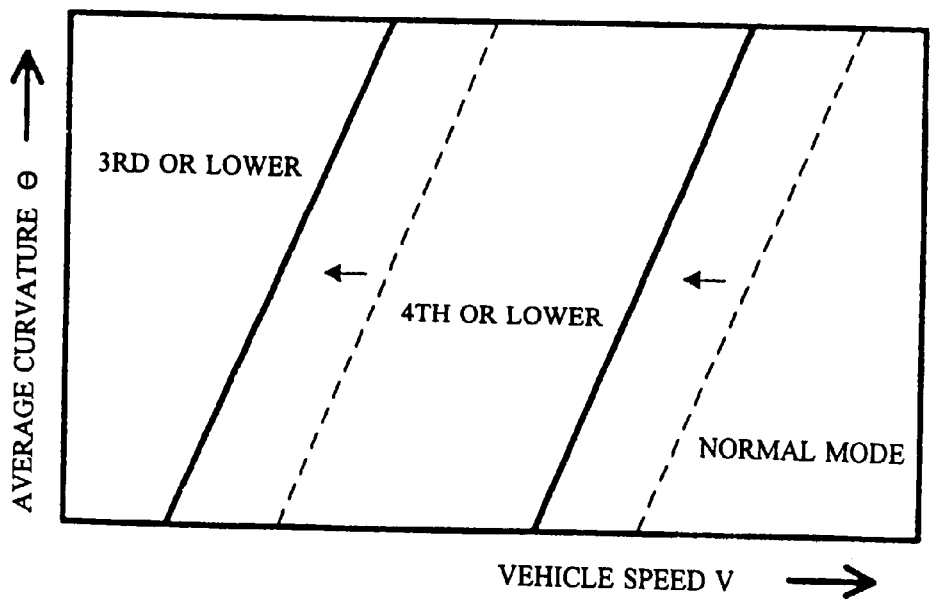
FIG. 21 is still another transmission control map used in the third embodiment.

Although in the foregoing embodiment the transmission map of FIG. 17 is used to determine necessity for upper-limit transmission stage control and the actual upper-limit speed, control may be changed to another map of FIG. 21 which has a larger area allowing the driver's control of driving. It may be possible to provide a plurality of transmission maps, one of which is selectable depending on the engine capacity and the vehicle type.

In another embodiment, as shown in FIG. 21, border lines in the control transmission map between the control areas may be shifted depending on the altitude variation H. In the example shown, the border lines are shifted in parallel toward the low-speed side (from the dotted lines to the solid lines) when the altitude variation H exceeds a predetermined standard. The low speed areas in the map of FIG. 17 may be broadened as the average curvature Θ decreases. The respective control areas in the transmission map may be shifted continuously in response to a change of the altitude variation H, which provides favorable transmission control having an improved adaptability to the road shape.

Figure 22:
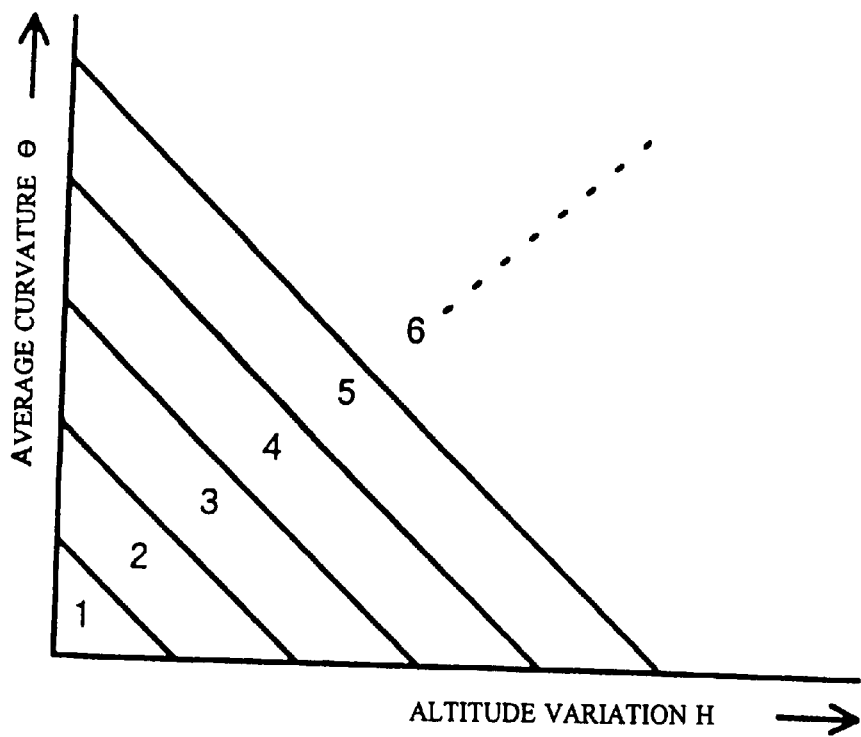
FIG. 22 is a map for determination of a reference value.
Figure 23:
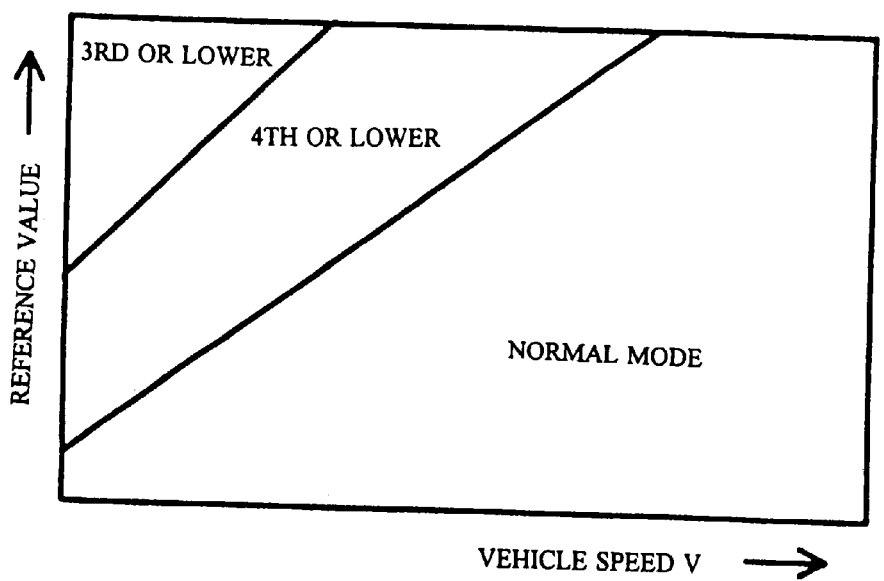
FIG. 23 is still another transmission control map for use in the third embodiment.

Although the control transmission map of FIG. 17 determines the shiftable range with reference to the vehicle speed H and the average curvature Θ, the shiftable range may be determined with reference to the vehicle speed H, the average curvature Θ and also the altitude variation H, as shown in FIGS. 22 and 23. More specifically, a reference value is first determined by reference to the map of FIG. 22 applying the average curvature Θ and the altitude variation H, and then the upper-limit transmission stage is determined by the map of FIG. 23 with reference to the reference value and the vehicle speed. This arrangement provides favorable transmission control having an improved adaptability to the road shape.

As has been described, in accordance with the vehicle control device of the present invention, it is possible to control the transmission to have a gear ratio well adapted to the road shape. Still, this control allows the driver to freely drive the vehicle to his or her own free will under some circumstances.

Fourth Embodiment

In this embodiment, there is provided a standard acceleration calculating means that calculates standard acceleration of the vehicle in accordance with the vehicle speed, the throttle opening and the gear ratio, in addition to the radius-of-curvature calculating means and the road shape discriminating means of the second and third embodiments. The standard acceleration calculating means comprises data memory 12 and navigation processing unit 11.

In this embodiment, navigation processing unit 11 determines a plurality of vehicle speeds V, among which the narrowest range (or the lowest one of the shiftable upper-limit stages of the respective ranges) is selected for actual transmission control.

More specifically, the first upper-limit stage is determined by the curvature that has been calculated by the radius-of-curvature calculating means, the second upper-limit stage is determined by the road shape that has been determined by the road shape discriminating means, and the third upper-limit stage is determined by the standard acceleration that has been determined by the standard acceleration calculating means. Navigation processing unit 11 selects the lowest one among the first to third upper-limit stages and outputs a signal indicating the said speed to A/T ECU 40.

The first and second upper-limit speeds may be determined in the same manner as has been described in the second and third embodiments. The third upper-limit speed may be determined in the following manner.

More particularly, the third upper-limit speed is determined in accordance with the road slope, one of the items of road information.

First, the current acceleration β1 is determined from a variation of the vehicle speed V, and then compared with a standard acceleration β0. The standard acceleration β0 is an assumed acceleration at the time when driving on a flat grade, and has been determined from engine drive power, drive resistance and a standard vehicle weight M which may be calculated from the data table which, in turn, is prepared with parameters for the vehicle speed V, the throttle opening γ and the gear ratio. When such comparison reveals β0>β1, it is determined that the vehicle is currently running up an incline. On the other hand, it is determined that the vehicle is currently running downhill in the case of β0<β1. In both cases, the transmission is so controlled that a gear speed lower by one than the current gear speed should be the upper-limit transmission stage.

Figure 24:
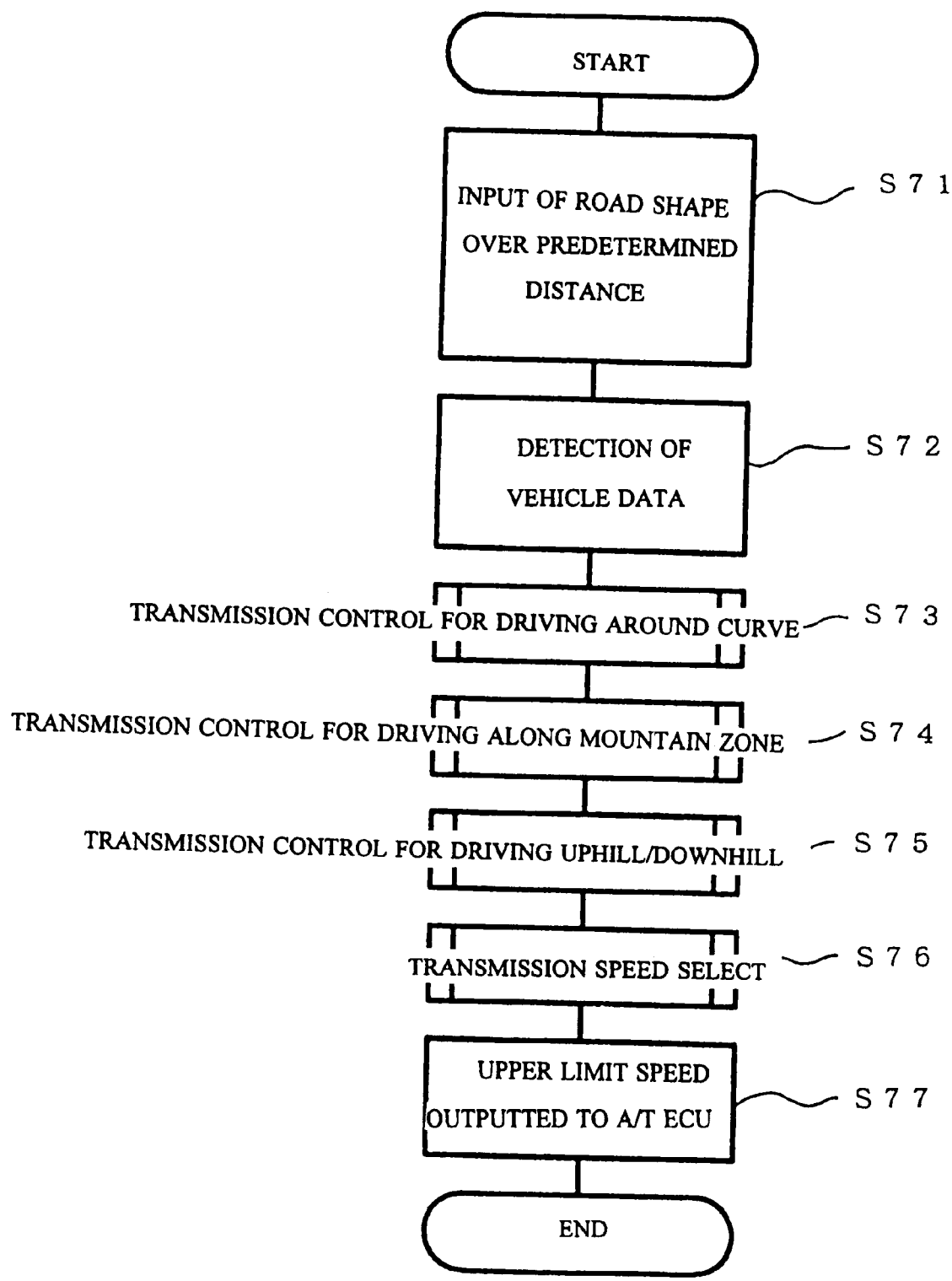
FIG. 24 is a flowchart showing the control routine of the fourth embodiment.

Control operation of navigation processing unit 11 will now be described with reference to the flow charts of FIGS. 24 to 27. The flowcharts of FIGS. 24 and 25 show the control operation carried out when the vehicle is running through the curve of FIG. 14.

First, navigation processing unit 11 acquires the road information from data memory 12 (at step S71). The road information includes coordinate data (X1, Y1)-(Xn, Yn) of nodes N1-Nn (FIG. 14). From such road information, it determines angles at respective nodes between two adjacent segments before and after the nodes, and thus determines the radii of curvature at respective nodes, from which it further determines the continuity of the curve and the curvature variation. Further, it calculates a distance (d) from the current vehicle position to the entrance to the curve, thereby determining the average curvature e and the average altitude variation H in accordance with the equations (1) and (2).

Next, it acquires data indicating the current vehicle condition or status, including a throttle opening, variation in accelerator opening, a vehicle speed V, a shift position, a transmission speed, and a transmission mode, at step S72.

Figure 25:
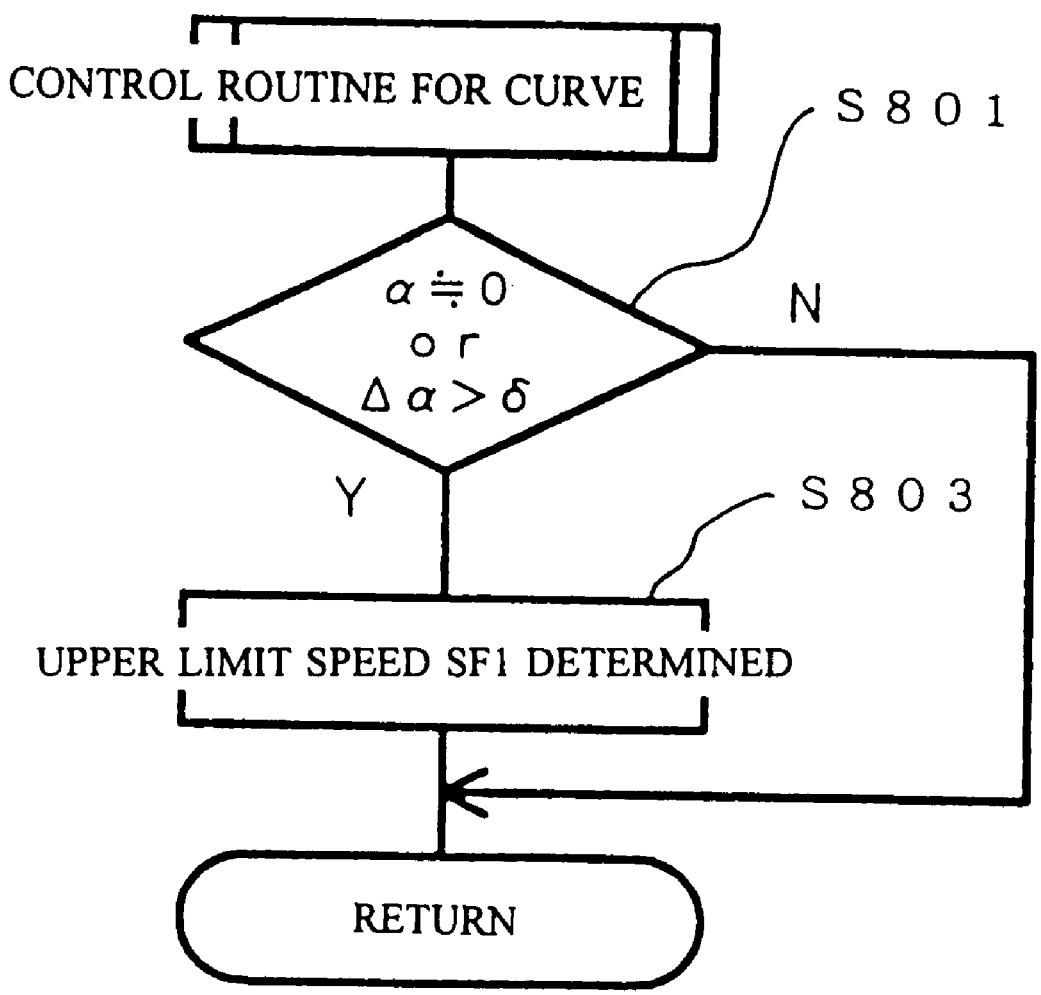
FIG. 25 is a flowchart of a subroutine for Step S73 in FIG. 24.

Next, it executes the sub-routine of FIG. 25 ("first subroutine") at step S73. In this sub-routine, at step S801, it is determined if the current accelerator opening is approximately zero, or if the accelerator opening is sufficiently small and further decreased by a variation Δα larger than a predetermined percentage δ. If S801 outputs the answer of YES, it is determined that the driver intends to slow down, so that the upper-limit transmission speed SF1 is selected from the transmission control maps of FIGS. 10–12 at step S803. The upper-limit transmission speed SF1 is determined from the distance (d) and the radius of curvature at S71 and the vehicle speed V at S72.

On the other hand, if S801 outputs NO as the answer, it is determined that the driver has no intention to slow down, in which case no control is carried out to determine the upper-limit transmission speed and the procedure is returned to the main routine of FIG. 24. Incidentally, even if a YES answer is obtained at S801, when the vehicle speed V is larger than a predetermined speed the upper-limit transmission speed control is not actually carried out, which allows the driver to shift gears.

Figure 26:
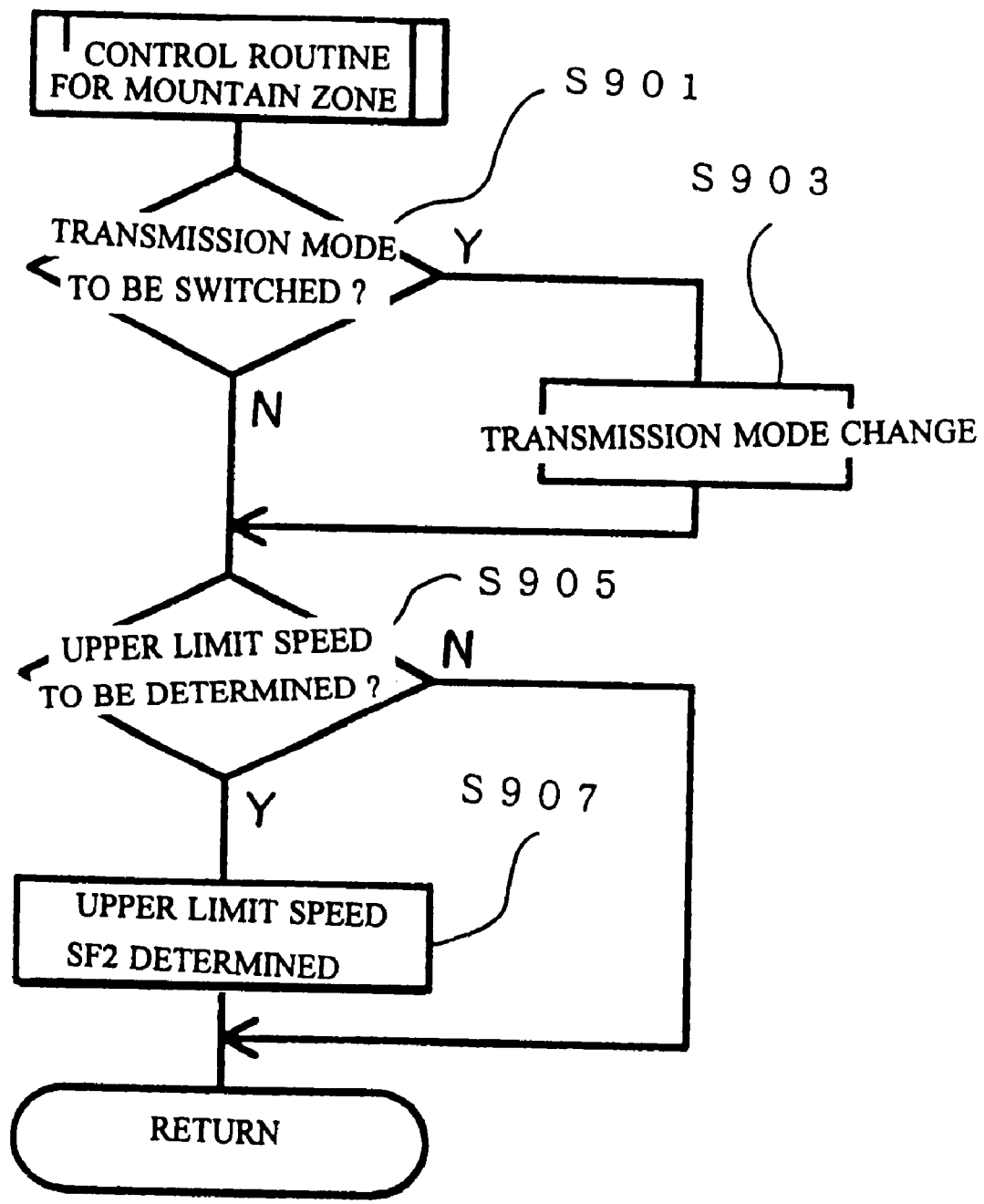
FIG. 26 is a flowchart of a subroutine for Step S74 in FIG. 24.

Next, a second sub-routine as shown in FIG. 26 is executed. In this sub-routine, it is first determined if it is necessary to change the transmission mode, based on the altitude variation H at S71, at step S901. More specifically, with reference to the map of FIG. 18, it is determined if the altitude variation H exceeds a standard value to determine the necessity for switching the transmission mode from the current mode to another. If the altitude variation H is greater than a standard value (YES at S901), a switch signal is output for switching the current transmission mode to the power mode in A/T ECU 40, at step S903. If not (NO at S901), the current transmission mode is maintained.

Then, the average curvature Θ at S71 and the vehicle speed V at S72 are applied to the control transmission map of FIG. 17, whereby navigation processing unit 11 determines if the upper-limit transmission speed control should be carried out in accordance with the transmission control map, at step S905. If the answer is YES at S905, it also determines the shiftable upper transmission stage in accordance with the map of FIG. 17. For example, if the current relationship between the average curvature Θ and the vehicle speed V is represented by point (b) in FIG. 17, it is determined that the driver has no intention to slow down, leading to the answer of NO at S905, in which case no control is executed to set the upper-limit transmission stage and the procedure is returned to the main routine of FIG. 24. In this case, the usual automatic transmission control is carried out in the currently available transmission mode (that is the normal mode in the example of FIG. 17).

When the current relationship between the average curvature Θ and the vehicle speed V is represented by point (a) in FIG. 17, the answer at S905 is YES and it is determined that the automatic transmission should be so controlled that the transmission stages are shiftable within 1st to 3rd gear speeds and no up-shift to 4th or higher gear speed is allowed. In this case, the upper-limit transmission stage SF2 is 3rd, in accordance with the control transmission map. Then, the procedure is returned to the main routine of FIG. 24.

Figure 27:
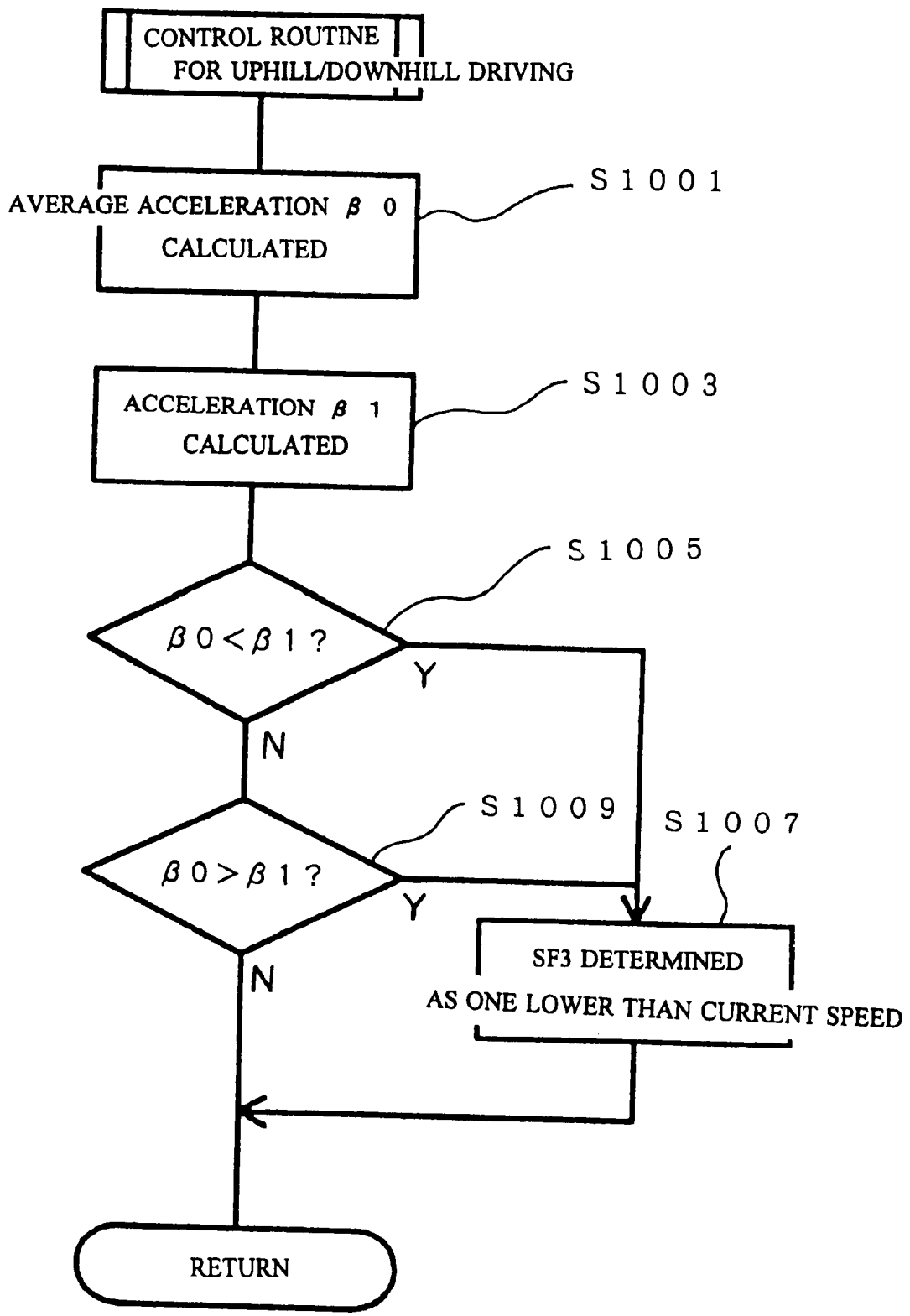
FIG. 27 is a flowchart of a subroutine for Step S75 in FIG. 24.

Next, the third sub-routine of FIG. 27 is executed at step S75. This sub-routine begins with step S1001 for determining a standard acceleration β0 from the vehicle speed V, the throttle opening, the transmission speed and the standard vehicle weight by reference to the data table. Then, the current acceleration β1 is determined from a variation of the vehicle speed V, at step S1003. At step S1005, it is determined if β0<β1. If the answer is YES at S1005, which means that the vehicle is running downhill, a gear speed lower by one than the current gear speed is determined as the upper-limit transmission stage SF3 at step. S1007.

If the answer is NO at S1005, it is then determined if β0>β1 at step S1009. If the answer is YES at S1009, which means that the vehicle is running uphill, a gear speed lower by one than the current gear speed is determined as the upper-limit transmission stage SF3 at S1007. Through execution of steps S1001–S1009 navigation processing unit 11 functions as means for calculating the standard acceleration.

When the answers at S1005 and S1009 are both NO, which means that the vehicle is running on level land, the upper-limit transmission stage SF3 is not determined, and the procedure is returned to the main routine of FIG. 24. The upper-limit transmission stage SF3 is determined from the data table by applying the parameters of the vehicle speed V and the throttle opening. Preferably, there are two different data tables to be referred to separately, one for uphill driving and one for downhill driving.

The three upper-limit transmission speeds SF1, SF2 and SF3 determined respectively by the first to third sub-routines are compared with each other to select the lowermost gear speed, which should be the actual upper-limit transmission stage, at step S76.

A signal indicating the finally determined upper-limit transmission speed at S76 is output to A/T ECU 40, at step S77, where the transmission is controlled such that a gear change is permitted within 1st to the determined upper-limit speed in accordance with the currently available transmission mode. When no upper-limit speed is determined in the respective sub-routines, it is determined that the driver does not intend to decelerate so that no control is made to restrict the transmission shiftable range, allowing the driver complete liberty in gear-change selections.

The first sub-routine provides relatively short-range control to determine the upper-limit transmission speed SF1, whereas the second and third sub-routines provide relatively wide-range control to determine the upper-limit transmission speeds SF2 and SF3. Accordingly, the transmission control of this embodiment provides a comfortable ride even with sudden changes to the road conditions, without need of frequent gear-change.

Fifth Embodiment

This embodiment has first means for inferring a need for determining a first upper-limit transmission stage in accordance with the road information for a predetermined section and second means for inferring a need of determining a second upper-limit transmission stage in accordance with the road information of a sub-section that is a part of the predetermined section.

The road information to be used in this embodiment includes the average curvature Θ and the average slope ⌈. In this embodiment, data memory 12, current position sensor 13 and navigation processing unit 11 cooperate with each other to detect and analyze the road information, as well as to set a predetermined section. The road shape inferring means includes average slope calculating means, average curvature calculating means, and first and second inferring means.

Primary and secondary inferences will be made from the average curvature Θ and the average slope ⌈ in the following manner.

The primary inference is made from the data table, applying parameters of the average curvature Θ and the average slope ⌈ of the predetermined section, to determine if it is necessary to restrict the shiftable range of transmission stages while driving through the section. More particularly, the average curvature Θ of the section is determined in like manner as in the previous third embodiment.

In this embodiment, the average slope ⌈ of the section is determined over a predetermined distance from the road information involved in navigation system device 10.

Figure 28:
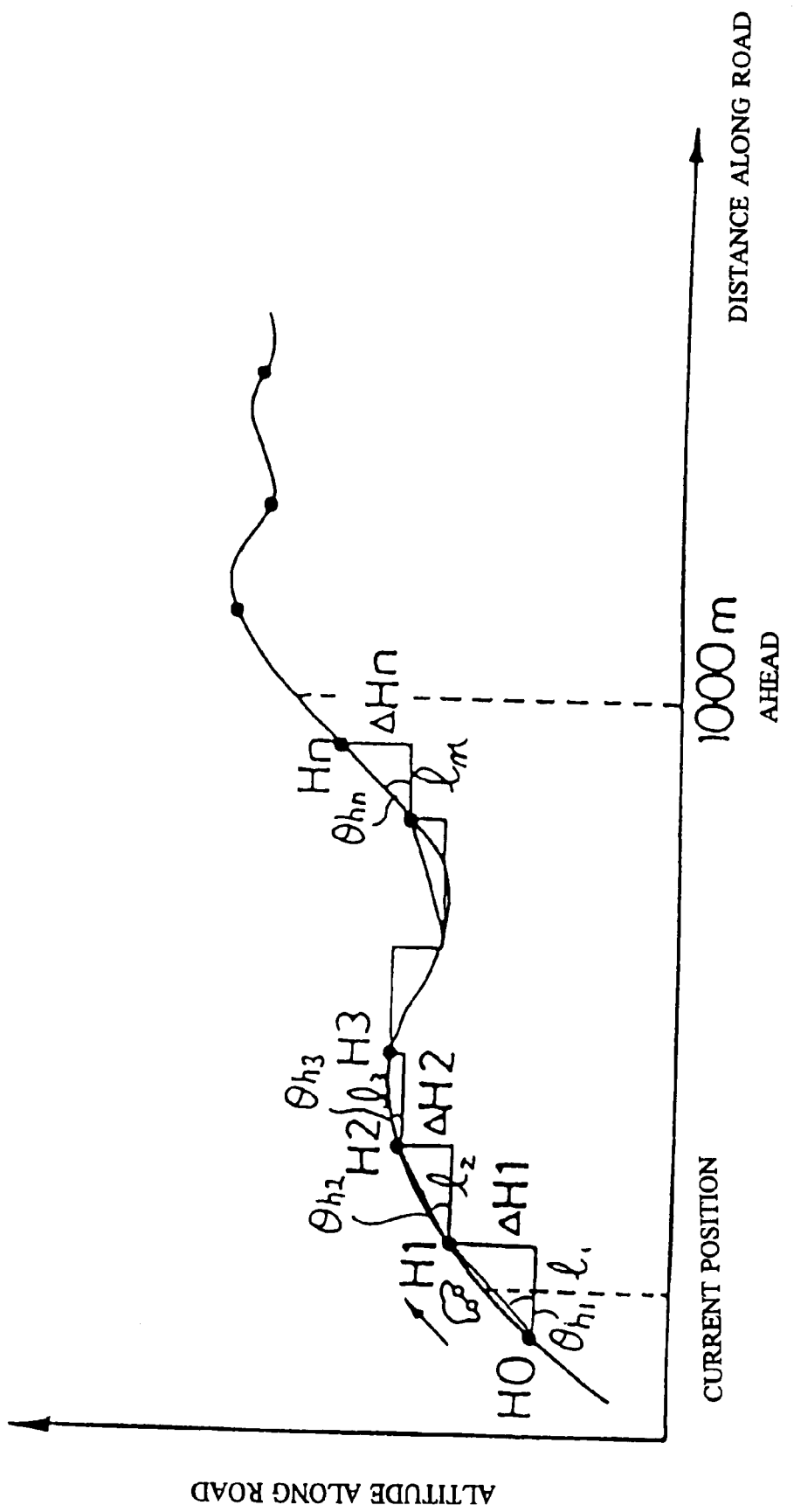
FIG. 28 is a diagram explaining calculation of average slope of the road.

FIG. 28 is an explanatory view showing a manner of determining the average slope ⌈ of a mountain road. As shown, nodes Nn are plotted at even spacings along the road. From the altitude data H at the respective nodes Nn, an altitude difference Hn-H(n−1) between the altitude H(n−1) at node N(n−1) and the altitude Hn at node Nn. The difference Hn-H(n−1) is represented as an altitude difference ΔHn at node Nn. In the like manner the altitude differences ΔH1-ΔHn are obtained. Distances L1-Ln between the adjacent nodes are also obtained. From these data, slope θ hn is determined in accordance with the following equation.

$$\theta hn = \tan^{-1}(\Delta Hn/Ln)$$

The average slope ⌈ can be determined by the following equation (3).

$$\lceil = (\Sigma|\theta hn|)/n \qquad \ldots (3)$$

Figure 29:
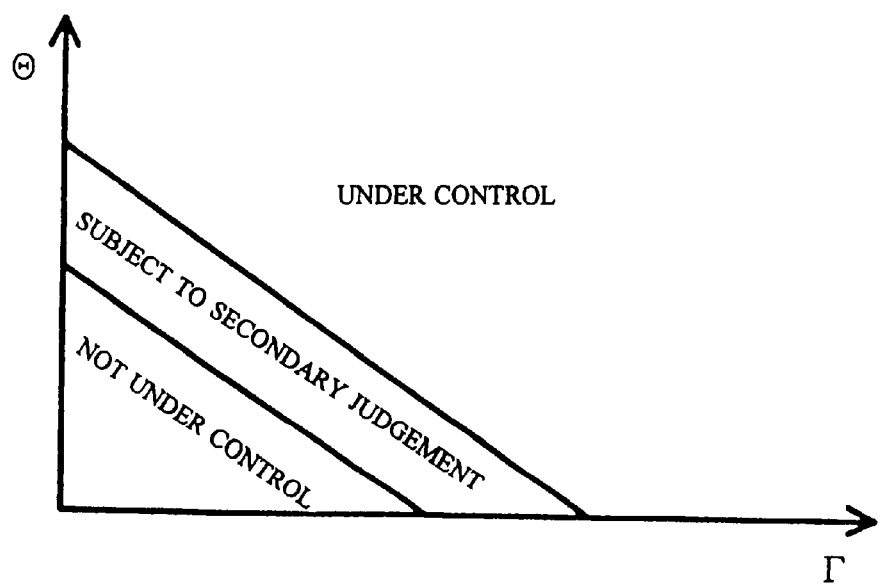
FIG. 29 is a map for inference of secondary judgement in the fifth embodiment.

From these two parameters, that is, the average curvature Θ and the average slope ⌈ which have been thus determined, it is then determined if it is necessary to restrict the shiftable range of transmission speeds by reference to the first map of FIG. 29. When a relationship between these two parameters is plotted within a range requiring the control, it is inferred that the shiftable range of the transmission speeds should be restricted during the entirety of the section. On the other hand, if such a relationship is plotted within another range requiring the secondary inference, the operation follows the secondary inference.

Figure 30:
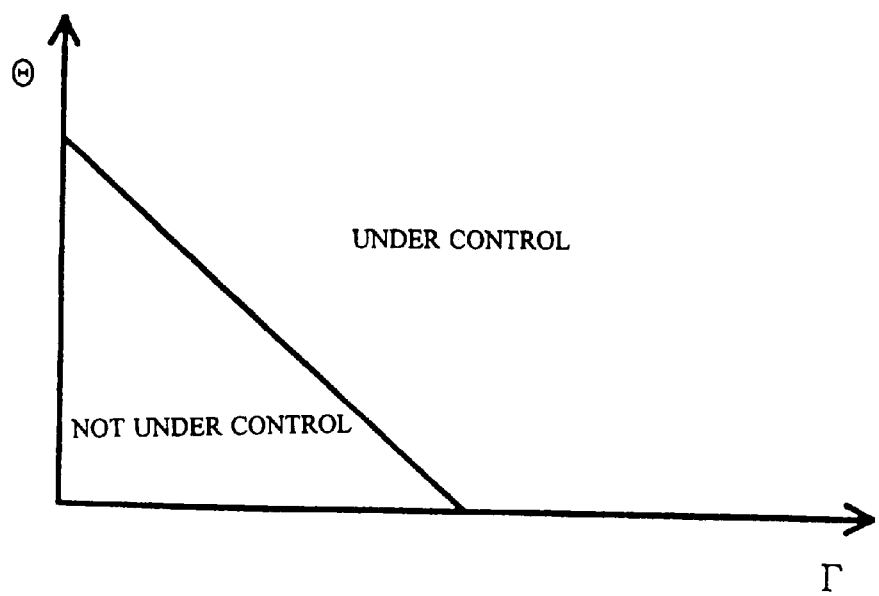
FIG. 30 is a map for inference of need for control.

In the secondary inference, the section is divided into two equal halves or sub-sections. For each sub-section, it is further determined if it is necessary to restrict the shiftable range of the transmission speeds by reference to the map of FIG. 30. More particularly, the secondary inference is made in order to carry out the upper-limit transmission control during the one of the two sub-sections which is more curved and/or more sloping.

The secondary inference may be followed by one or more additional inferences. As the number of inferences increases, the beginning and exit of sections (sub-sections) requiring the upper-limit transmission control are more precisely determined.

Figure 31:
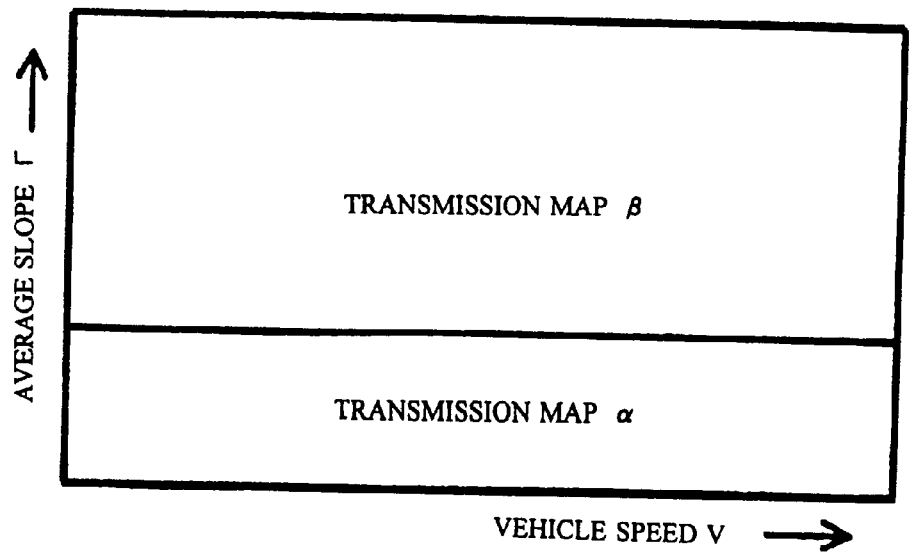
FIG. 31 is a map for transmission mode control based on the average slope.

Next, from the average slope ⌈ and the vehicle speed, the transmission mode is selected with reference to the transmission map of FIG. 31. When the average slope ⌈ is relatively large, a transmission map β is selected whereas when it is relatively small another transmission map α is selected. The transmission map α may be a map of a normal mode and the transmission map β may be of a power mode.

Figure 32:
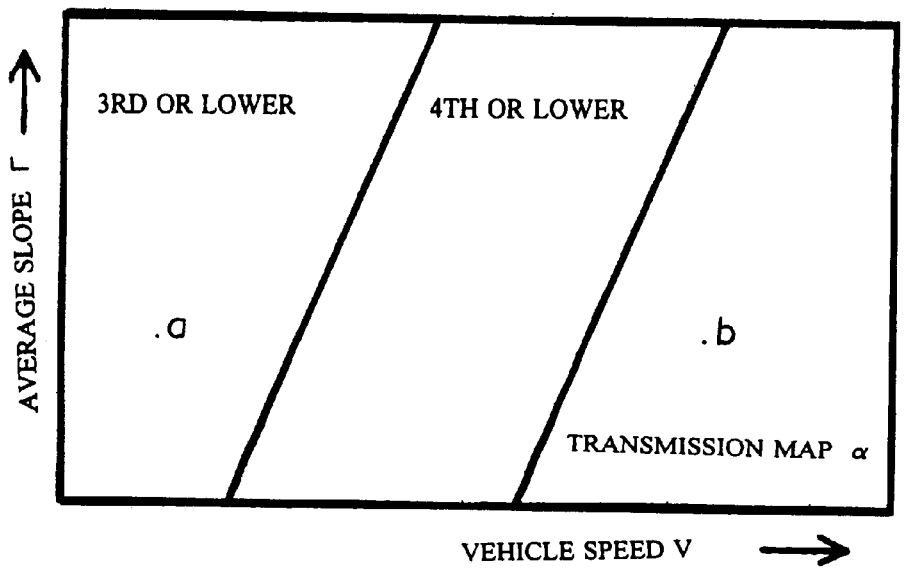
FIG. 32 is a transmission control map used in accordance with the fifth embodiment.

Then, from the average curvature Θ and the vehicle speed, the shiftable range of the transmission speeds is restricted by reference to the transmission control map of FIG. 32. In this embodiment, the upper-limit transmission speed is determined.

This control transmission map is prepared from the viewpoint of which speed is most appropriate when the vehicle is to be decelerated. However, when the vehicle speed is higher than a predetermined value, it is inferred that the driver has no intention of slowing down so that the upper-limit speed restricting control is nullified. When the upper-limit speed restricting control operates to select 3rd speed in accordance with the transmission control map, even if the normal transmission map designates 4th speed, a drive signal commanding 3rd speed is actually output. When the normal transmission map designates 2nd speed, since this speed is within the controlled shiftable range from 1st to 3rd speeds, a drive signal commanding 2nd speed is output. When the vehicle speed is greater than a predetermined value, by inferring lack of an intention to slow down, the upper-limit speed restricting control is cancelled and the transmission is controlled in accordance with the normal transmission map provided in A/T ECU 40.

Control operation by navigation processing unit 11 will now be described with reference to the flowcharts of FIGS. 33 and 34.

First, a sub-routine for inferring a control section begins at step S1101. This sub-routine follows the flowchart of FIG. 34. Navigation processing unit 11 acquires, at step S1201, the road information including the current position and the altitude data at nodes N1–Nn forward of the current position. From such road information, a section from the current position to a position a predetermined distance forward (1 km, for example) is determined as a tentative section. Then, from the road information are determined the average curvature Θ and the average slope ⌈ of the tentative section, at step S1203.

Then, the primary inference is made with reference to the map of FIG. 29 to determine if the transmission speed restricting control should be carried out, at step S1205. The first inferring means operates at this step. Depending on the result of inference at S1205 it is determined if the transmission speed restricting control should be applied to the tentative section at step S1207. If not, the procedure is returned to the routine of FIG. 33. If a need for conducting such control is inferred at S1207, then it is determined at step S1209 if the secondary inference is required by reference to the map of FIG. 29. If not, the tentative section at S1201 is determined as a (predetermined) control section, which means that the transmission speed restricting control should be carried out throughout the control section. If the answer at S1209 is YES, at step S1211, the tentative section is divided into two equal sub-sections, and the average curvature Θ and the average slope ⌈ are determined with respect to the divided two sub-sections. Then, the secondary inference is made at step S1213 by reference to the map of FIG. 30 to determine if the transmission speed restricting control should be carried out during travel of the first and second sub-sections. As has been described hereinbefore, the secondary inference is provided to clarify which sub-section has more intensive variation in road contour (winding and sloping). For example, when the first sub-section is much more winding and/or sloping, it will be inferred from the map of FIG. 30 that the first sub-section needs the transmission speed restricting control but the second sub-section does not require such control. When there is no remarkable change in road contour variation between the first and second sub-sections, it could be inferred that both sub-sections are not to be subjected to such control. The second inferring means operates at steps S1209–S1213.

From the inference at S1213 it is determined if one of the divided two sub-sections should be subjected to the transmission speed restricting control, at step S1215. If both sub-sections need no such control (NO at S1215), the procedure is returned to the routine of FIG. 33. If Yes, one of the first and second sub-sections, which has been determined at S1213, is now determined as a (predetermined) control section at step S1217.

Figure 33:
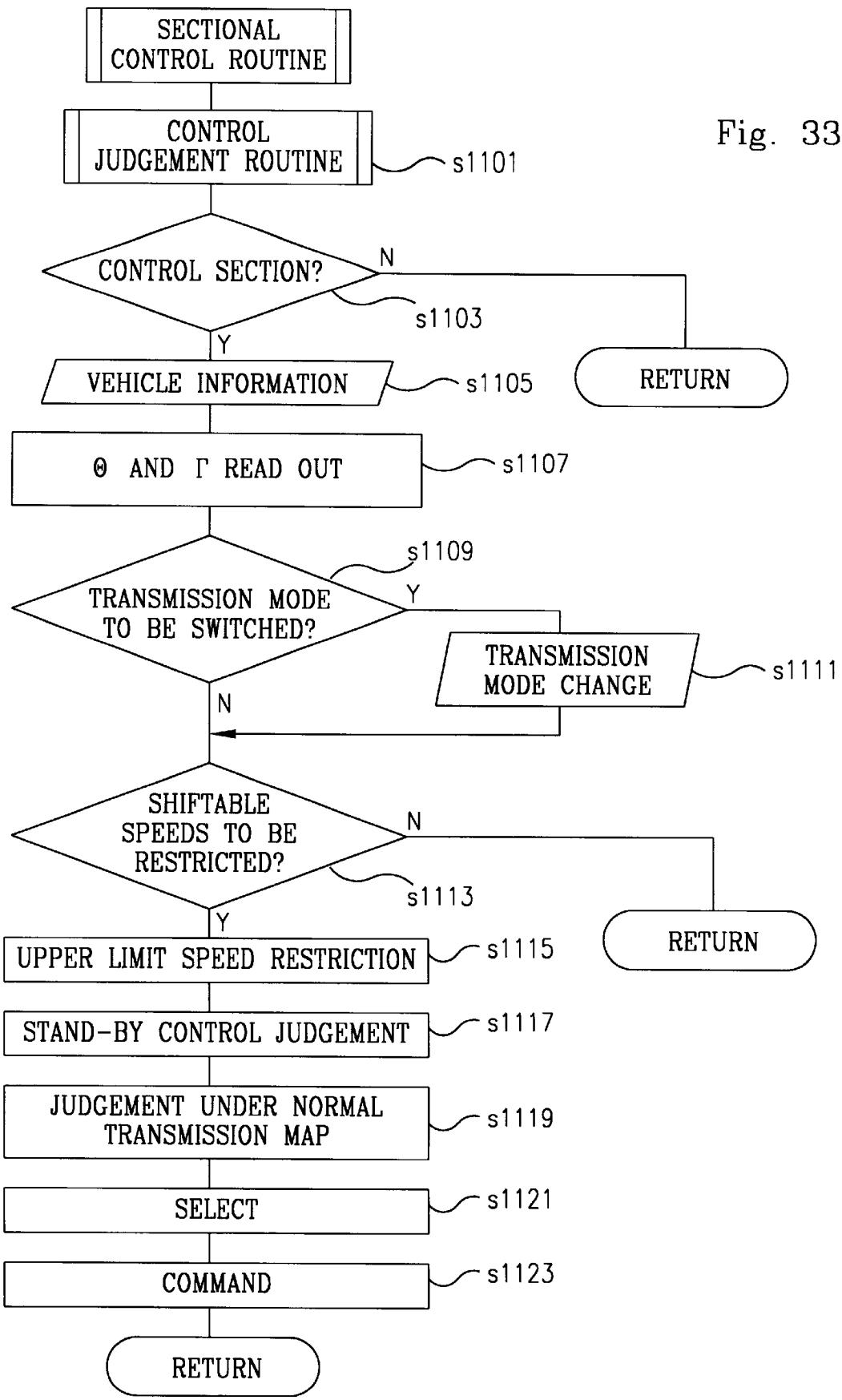
FIG. 33 is a flowchart of the control routine of the fifth embodiment.
Figure 34:
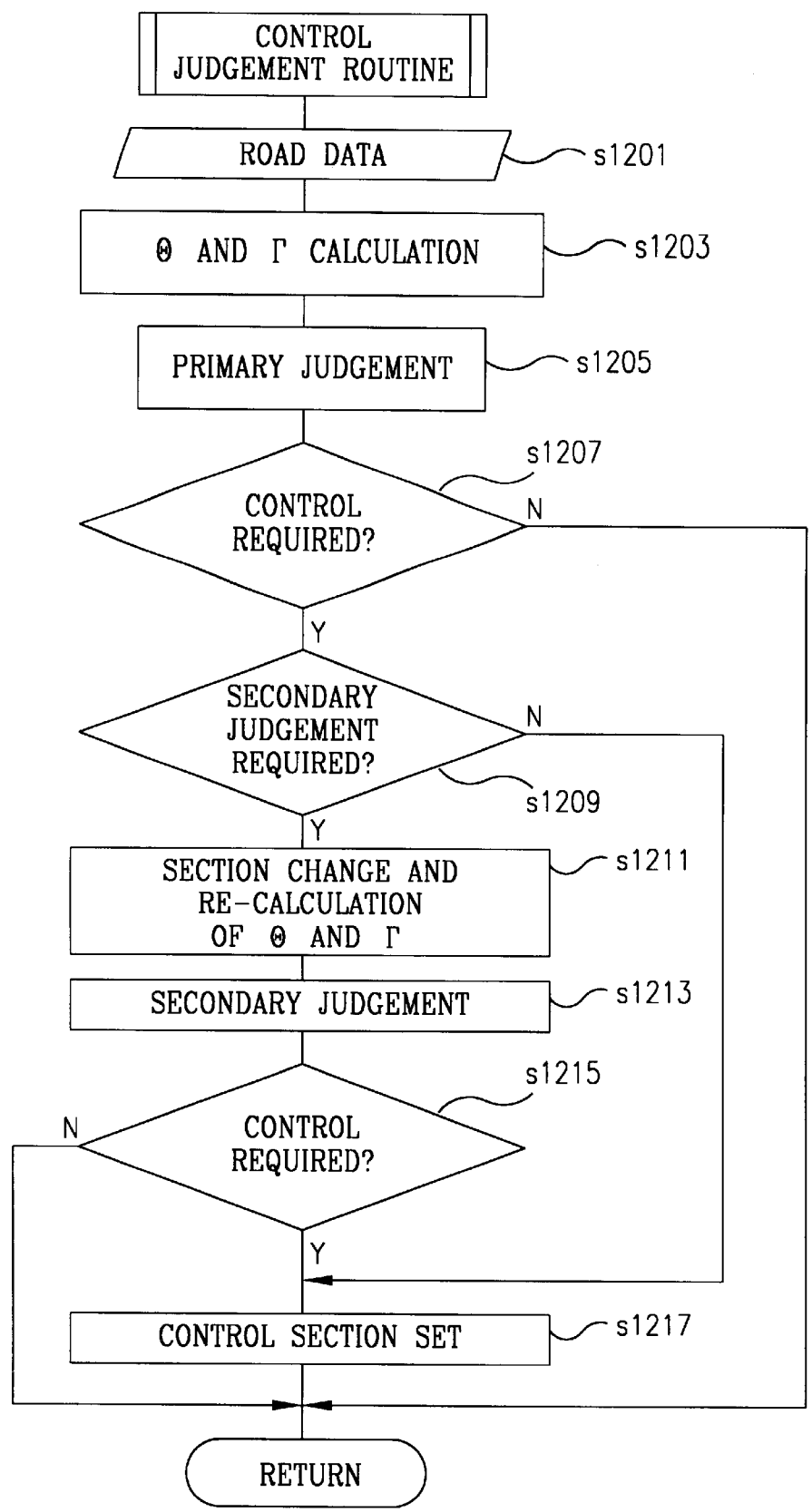
FIG. 34 is another flowchart showing control operation in the fifth embodiment.

When the control section is determined, the procedure is returned to the routine of FIG. 33 and advanced to step S1105 where it is determined if the current vehicle position is within the determined control section. When the vehicle is currently out of the control section, or when the sub-routine of FIG. 34 determines no control section, the answer at S1103 is NO, and the procedure is returned to the main routine of FIG. 24.

When the current vehicle position is within the control section (YES at S1103), the vehicle information is obtained at step S1105. The vehicle information includes the vehicle speed V, the throttle opening, the shift position, the transmission speed and the transmission mode. Then, the average curvature Θ and the average slope ⌈, that have been determined through the routine of FIG. 34, are confirmed at step S1107.

It is then determined at step S1109 if the transmission map should be switched with reference to the average slope ⌈. More particularly, in accordance with the map of FIG. 31, it is determined if the average slope ⌈ is greater than a standard value to determine the necessity of switching the current transmission map to another one.

When the average slope ⌈ is greater than a standard value and the current transmission map is a map α, or when the average slope ⌈ is lower than a standard value and the current transmission map is a map β (YES at S1109), a switch command signal is output to change the transmission map in A/T ECU 40, at step S1111.

Next, at step S1113, from the average curvature Θ and the vehicle speed, it is determined if the transmission speed restricting control should be made with reference to the transmission control map of FIG. 32. When such control is required (YES at S1113), the upper-limit transmission speed is determined at step S1115. If the answer at S1113 is NO, the procedure is returned to the main routine of FIG. 24.

In a modified embodiment, the average curvature Θ and the average slope ⌈ are correlated with each other to obtain a coefficient, and the transmission control map is prepared with the coefficient as the ordinate and the vehicle speed as the abscissa. In this embodiment, inferences at S1109 and S1113 may be integrated into one step.

After determining the upper-limit transmission speed, it is then determined at step S1117 if the stand-by control should be carried out. The stand-by control aims at assisting smooth acceleration when the vehicle is running through a crossroad or a winding road where frequent gear-change (up-shift and down-shift) is required.

Figure 35:
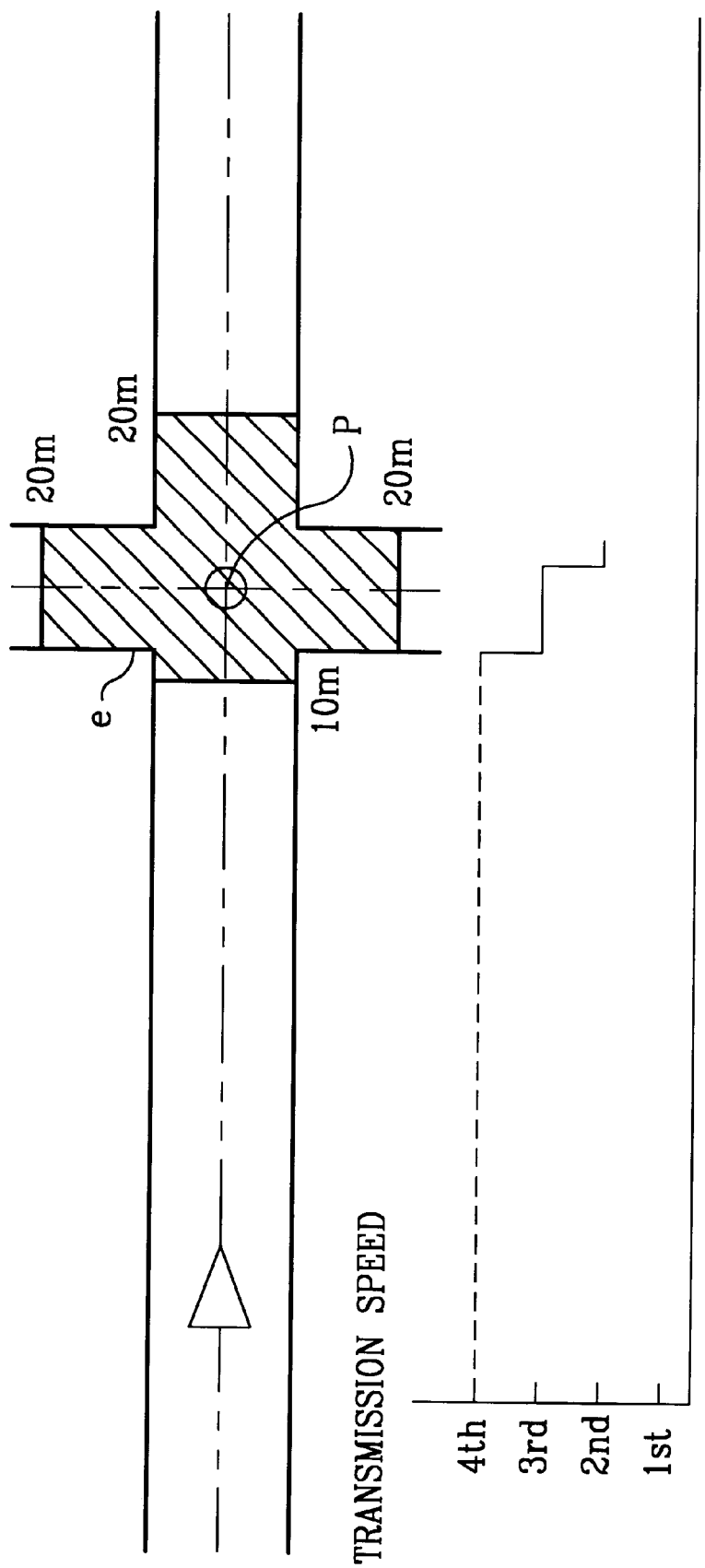
FIG. 35 is a diagram showing the manner of controlling the transmission during driving through an intersection.

For example, as shown in FIG. 35, there is a control area (e) indicated as a hatched area which starts at a point 10 meters before a center P of a crossing and terminates at 20 meters after the center P along three branched roads. When the vehicle speed becomes lower than a first predetermined speed within the control area, the upper-limit transmission speed is restricted to be 3rd speed, even if the transmission control map allows 4th speed. When the vehicle speed is further decreased to below a second predetermined speed that is still lower than the first predetermined speed, the upper-limit transmission speed is restricted to be 2nd speed, even if the transmission control map allows higher speeds. When the vehicle speed is sufficiently high, that is, greater than the first predetermined speed, it is inferred that the vehicle should go straight through the intersection and, therefore, stand-by control is not carried out. Thus, the stand-by control further restricts the shiftable area (the upper-limit speed) of the transmission speeds within the shiftable area that has been determined or restricted at S1115 by reference to the transmission control map of FIG. 32.

At step S1119, in accordance with the normal transmission map, from the vehicle speed and the throttle opening is determined a specific transmission speed.

The upper-limit transmission speeds determined at S1115 and S1117 are compared with the transmission speed determined at S1119 to select the lowest one at step S1121.

A signal indicating the lowest transmission speed at S1121 is output to the A/T ECU 40 for a gear change (down-shift) to the said speed, at step S1123. In a modified embodiment, a signal indicating a lower one of the upper-limit transmission speeds at S1115 and S1117 is supplied to A/T ECU 40, in which case operation through S1119–S1123 is carried out by A/T ECU 40. Alternatively, A/T ECU 40 acquires the road information from the navigation system device 10 to carry out the routines of FIGS. 33 and 34.

As has been described, in this embodiment, a predetermined control section is divided into halves, and that one which has more road contour (curve and slope) variation is subjected to the upper-limit transmission speed restricting control, which provides a smooth drive conforming to the driver's intention to decelerate. Further, it is possible to control the transmission ratio by reference to the average slope, which prevents unnecessary up-shift and allows acceleration and deceleration in quick response to the driver's demands.

Sixth Embodiment

In this embodiment the control routine determines a shiftable transmission range or the upper-limit transmission stage from a recommended vehicle speed at a specific point or node on the drive route and the current vehicle speed. The recommended vehicle speed at each node is determined by recommended vehicle speed calculating means. Here, the sixth embodiment is described as applied to a 4-speed automatic transmission.

Figure 36:
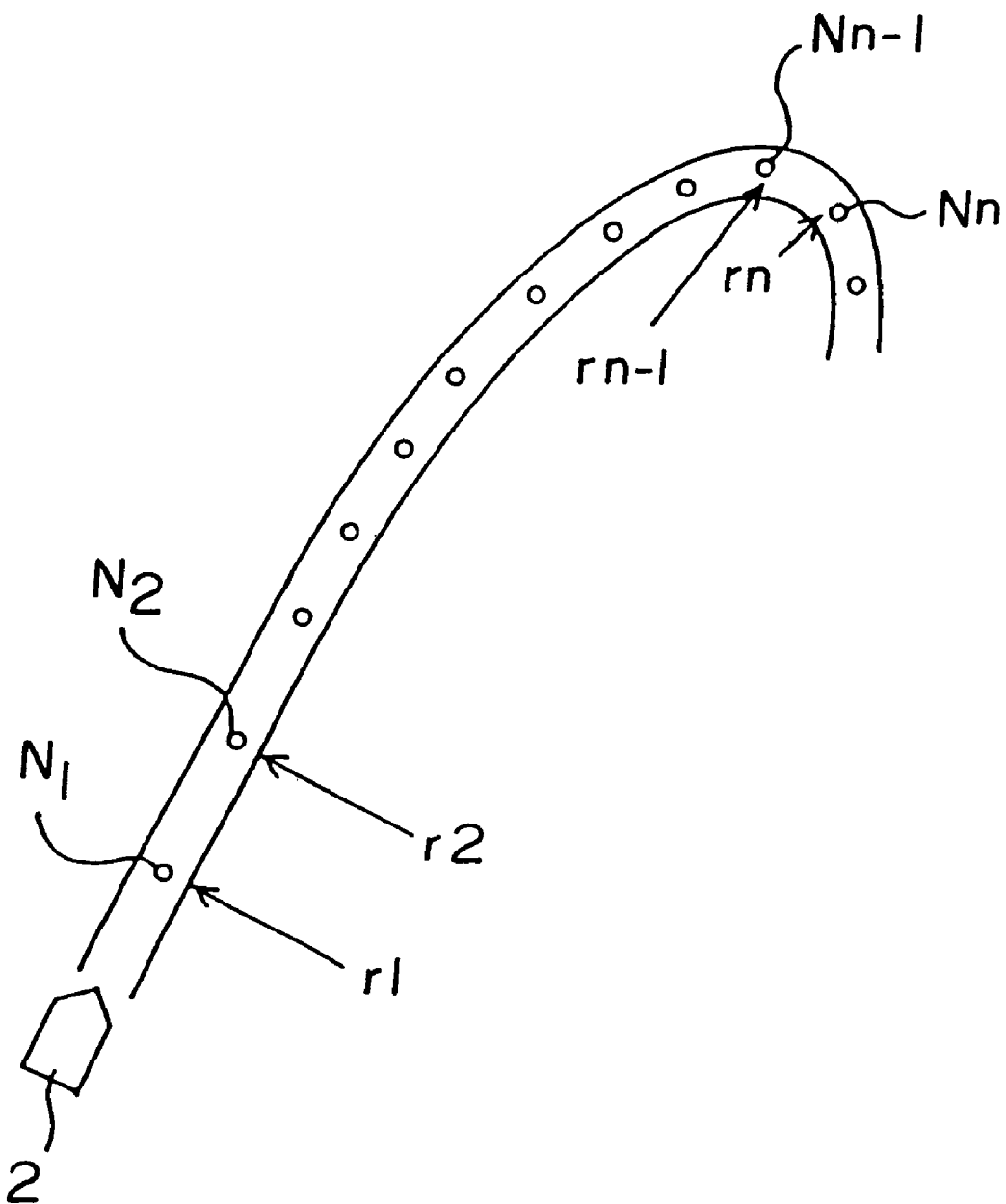
FIG. 36 is a diagram showing an example of node positions on a road.
Figure 37:
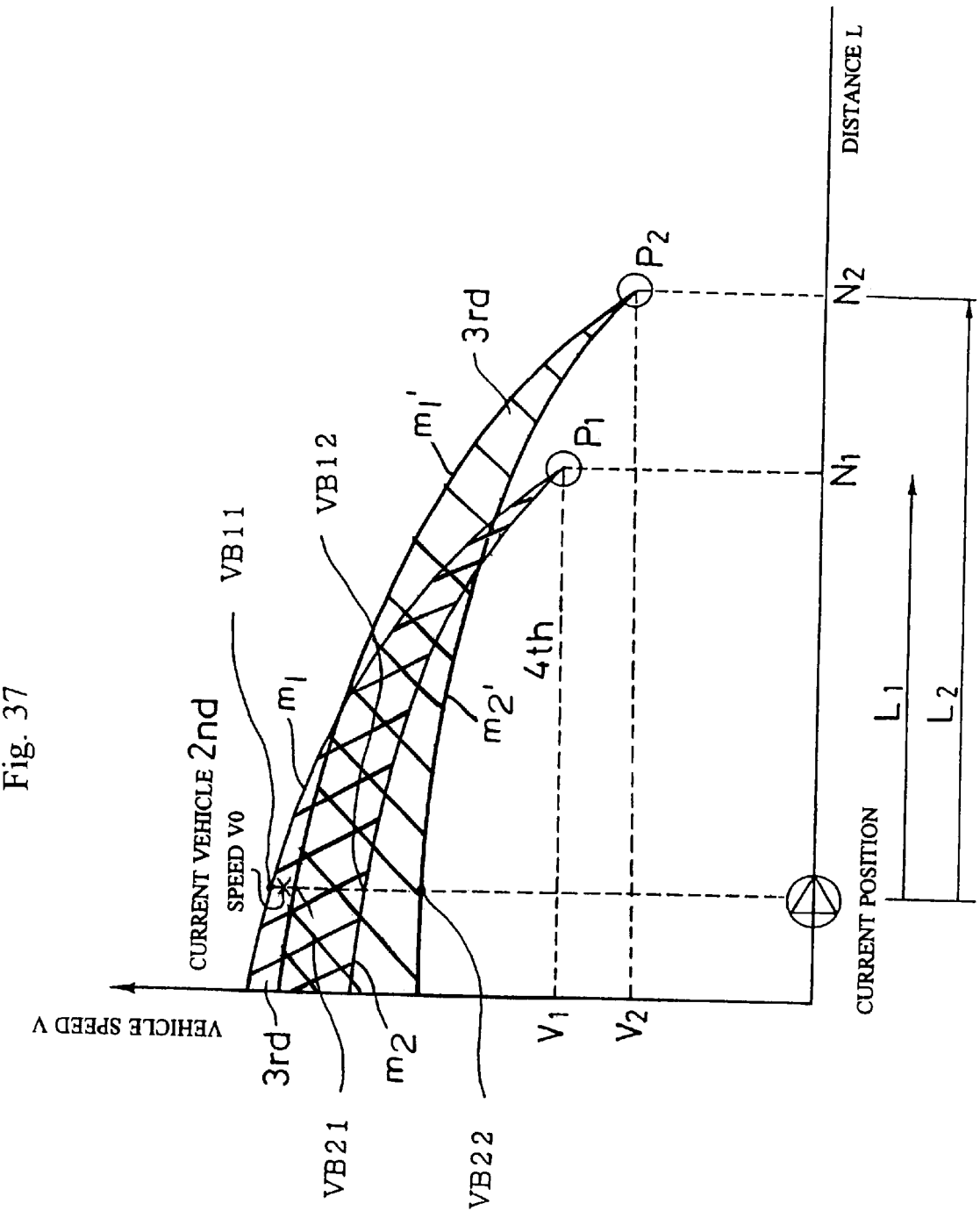
FIG. 37 is a transmission control map used in accordance with the sixth embodiment.

FIG. 36 shows node positions on the road and FIG. 37 is a transmission control map to be used for determining the upper-limit gear speed from the recommended vehicle speed. Current position sensor 13, data memory 12 and navigation processing unit 11 cooperate with each other as distance calculating means for calculating distances L1-Ln from the current position to the respective nodes.

Data memory 12 and transmission control 40 cooperate with each other as node radius calculating means for calculating radii r1-rn at the respective nodes N1-Nn. The radius at a node can be determined by, for example, an angle between two adjacent segments connected at the node.

The recommended vehicle speed calculating means determines a vehicle speed (node speed) that is recommended for running through the node, by reference to a predetermined data table, from the node radii r1-rn and a predetermined lateral force.

Figure 38:
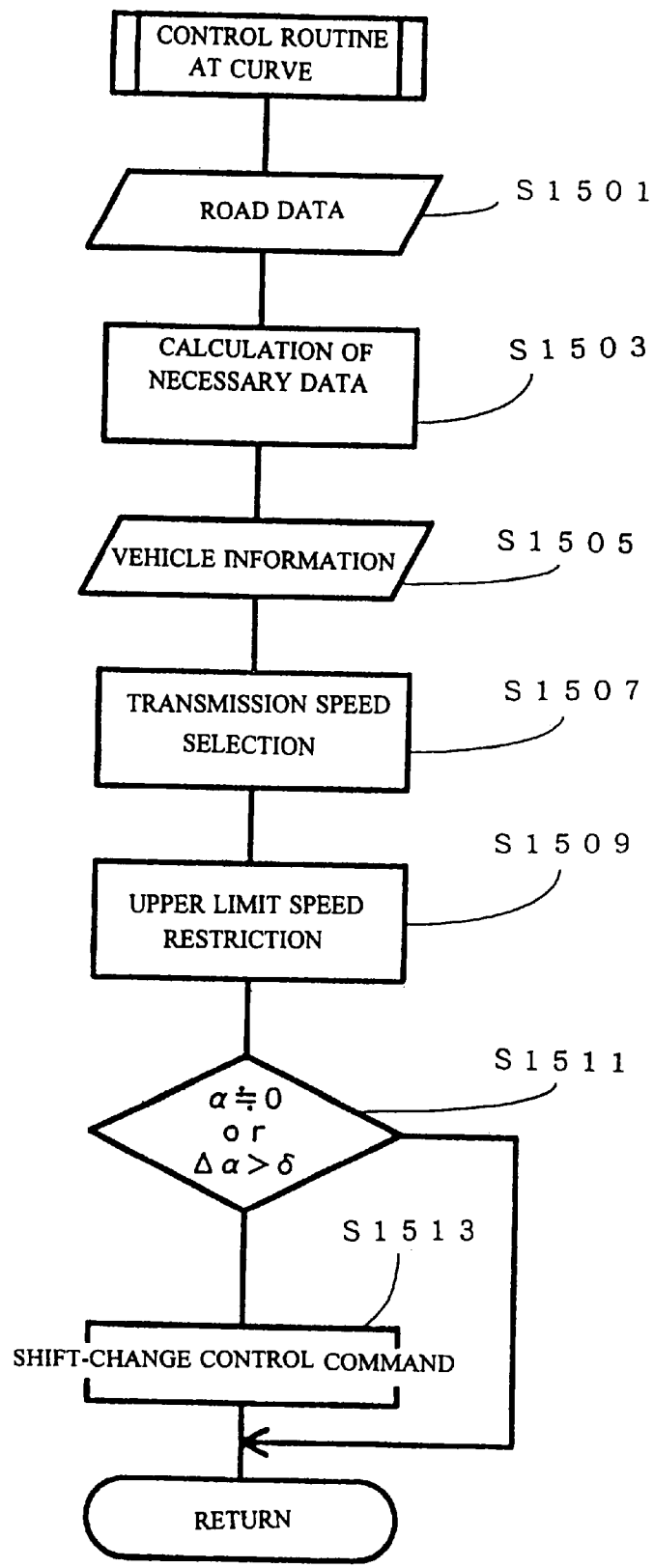
FIG. 38 is a flowchart showing the control routine of the sixth embodiment.

Control operation of navigation processing unit 11 will now be described with reference to the flowchart of FIG. 38.

First, at step S1501, navigation processing unit 11 acquires the current position of the vehicle 2 and the forward road data including the road type, the road shape and the coordinate data of the respective nodes N1-Nn forward of the current vehicle position.

From the data acquired, especially the coordinate data of nodes N1-Nn on the scheduled drive route, distances L1-Ln from the current position to the respective nodes and radii r1-rn at the respective nodes are determined at step S1503.

Next, at step S1505, vehicle information is acquired including the vehicle speed V, the throttle opening, the accelerator opening $\alpha$ and the braking signal. Then, a normal transmission stage is determined from the throttle opening and the vehicle speed by reference to the normal transmission map at step S1507. It is determined, at step S1509, if the upper-limit transmission stage restricting control should be carried out, from recommended node speeds V1-Vn determined from the node radii r1-rn at the respective nodes N1-Nn, the current vehicle speed V0 and the distances L1-Ln from the current position to the respective nodes N1-Nn, by reference to the transmission control map of FIG. 37.

More particularly, reference vehicle speeds are calculated from the recommended node speeds V1-Vn, optimum deceleration G and a sectional distance L.

In the transmission control map of FIG. 37 there are plural sets of deceleration curves. Deceleration curves m1, m2 show relationships between the current vehicle speed V0 and a specific transmission speed to which the transmission should be down-shifted in order to reduce the current vehicle speed V0 to the recommended speed V1 when reaching the node N1. Likewise, deceleration curves m1', m2' show an optimum transmission speed for reducing the current vehicle speed V0 to the recommended speed V2 at the node N2.

An example in FIG. 37 shows that the current vehicle speed V0 is above the curve m2 but below the curve m1. A point of intersection between the curve m1 and a perpendicular line through the current vehicle speed V0 shows a reference speed VB11 that is the upper-limit speed for achieving the recommended speed V1 at the node N1 while maintaining 3rd gear speed. A point of intersection between the curve m2 and a perpendicular line through V0 shows another reference speed VB12 that is the upper-limit speed for achieving the recommended speed V1 at the node N1 while maintaining 4th gear speed. Since, in this example, the current vehicle speed V0 is lower than the reference speed VB11 but exceeds the reference speed VB12, it is understood that driving at 3rd gear speed is recommended in order to reduce the vehicle speed from the current value V0 to the recommended speed V1 when or before reaching the node N1. Likewise, since the current vehicle speed VO is higher than the curve m1' in this example, it is understood that a down-shift to 2nd speed is necessary to reduce the vehicle speed to the recommended speed V2 when or before reaching the node N2.

As above described, the current speed VO is compared with the reference speeds in the map of FIG. 37 to determine if it is necessary to carry out the upper-limit transmission stage restricting control. When different transmission stages are determined to achieve the recommended speeds V1-Vn at the nodes N1-Nn, the lowest one is selected as the upper-limit transmission speed to be used for control in accordance with the present invention. For example, in the example shown in FIG. 37, the upper-limit transmission speed is 2nd.

A transmission control map such as shown in FIG. 37 is prepared from the viewpoint of determining which transmission stage is most appropriate to reduce the vehicle speed as recommended at the respective nodes, which is, however, applicable in practice only with confirmation of the driver's intention to decelerate, as described later in detail.

Thus, it is determined at step S1511 if the driver intends to decelerate. In this embodiment, such a driver's intention is inferred by confirming that the accelerator's opening is substantially zero or that the accelerator's opening is sufficiently small and yet further reduced by a predetermined ratio δ or more.

When the answer at S1511 is YES, it is inferred that the driver has the intention of deceleration, and at the next step S1513, the upper-limit transmission speed at S1509 is compared with the transmission speed selected by the normal transmission map so as to output a command signal indicating the lowermost transmission speed. In a modified embodiment, at S1513, a signal indicating the upper-limit transmission speed determined at S1509 is output to A/T ECU 40 where it is compared with the transmission speed selected by the normal transmission map.

When the answer at S1511 is NO, it is inferred that there is no intention to decelerate, in which case only the normal transmission control is carried out.

In accordance with this embodiment, the necessity of performing the upper-limit transmission speed restricting control is judged for the respective points (nodes) on the drive route, which provides more precise control even with a complex road contour.

The above-described embodiments are only illustrative of the present invention and in no way limit the scope of the present invention. The automatic transmission to which the control of the invention is applied may be a continuously variable automatic transmission. In this case, a range (or an upper-limit) of a gear ratio is restricted in accordance with the invention. The upper-limit of the gear ratio may be changed continuously in conformity with change in the road contour that can be confirmed by reading out the road information.

Although hystereses are omitted from the control transmission maps in the illustrated embodiments, it is preferable to provide hystereses to prevent hunting.

The respective embodiments indicate different manners of determining the upper-limit transmission speed to be used in control of the automatic transmission. Any combination of the upper-limit transmission speeds is also within the scope of the present invention. When there are a plurality of upper-limit transmission speeds, it is practically preferable to choose the lowest one for safety.

Although in the foregoing description the upper-limit transmission stage is restricted, it is also possible to restrict the lower-limit transmission speed. For example, 2nd gear speed may be the lower-limit transmission stage, in which case a down-shift to 1st gear speed is prohibited. Such a control is preferable when driving on a road, such as a snowy road, having a low frictional coefficient.

As has been described, the present invention relates to the vehicle control system that is especially useful in automatic transmission control. In particular, this invention may be used in combination with a navigation system to provide automatic transmission control by utilizing road data and other data stored in the navigation system.

What is claimed is:

1. An automatic transmission control device for a vehicle, comprising:
   (a) road information obtaining means for obtaining road information pertaining to a scheduled drive route;
   (b) current position sensor means for detecting a current on-road position of the vehicle;
   (c) first gear ratio determining means for determining a first gear ratio range for the automatic transmission in accordance with a control program;
   (d) second gear ratio determining means for determining a second gear ratio range with an upper limit gear ratio for the automatic transmission, in accordance with the vehicle current position detected by said current position sensor means and the road information obtained by said road information obtaining means;
   (e) deceleration sensor means for detecting a decelerating operation by a driver of the vehicle; and
   (f) execution means for executing a down-shift of the automatic transmission to a gear ratio within the second gear ratio range responsive to detection of the driver's decelerating operation by said deceleration sensor means when a current gear ratio of the automatic transmission does not lie within the second gear ratio range determined by said second gear ratio determining means.

2. The device according to claim 1 wherein the decelerating operation detected by said deceleration sensor means is an operation selected from the group consisting of release of an accelerator pedal, decrease in degree of accelerator opening, engagement of a brake pedal, increase in depression of the brake pedal, decrease in degree of throttle opening, and switching on of a blinker.

3. The device according to claim 1 wherein there are provided at least two of said second gear ratio determining means, each of which individually determines the second gear ratio range with an upper limit gear ratio in accordance with the vehicle current position detected by said current position sensor means and different types of road information obtained by said road information obtaining means, said device further comprising selecting means for selecting the one of the second gear ratio ranges having the lowest upper limit gear ratio, said executing means executing the down-shift into the selected second gear ratio range.

4. The device according to claim 1 wherein the automatic transmission has a plurality of transmission stages, said execution means executing a down-shift from a current transmission stage to a lower stage having a gear ratio within the second gear ratio range.

5. An automatic transmission control device for a vehicle, comprising:
   (a) road information obtaining means for obtaining road information pertaining to a scheduled drive route;
   (b) current position sensor means for detecting a current on-road position of the vehicle;

(c) vehicle speed sensor means for detecting a current speed of the vehicle;

(d) first gear ratio determining means for determining a first gear ratio range for the automatic transmission in accordance with a control program;

(e) deceleration sensor means for detecting a decelerating operation by a driver of the vehicle;

(f) distance calculating means for calculating, from the road information obtained by said road information obtaining means, a distance from the current vehicle position detected by said current position sensor means to a specific position located ahead on the scheduled drive route;

(g) speed calculating means for calculating a reference speed at which the vehicle would safely pass through said specific position;

(h) deceleration inference means for inferring a need for deceleration of the vehicle from said current vehicle speed detected by said vehicle speed sensor, said reference speed calculated by said speed calculating means and said distance calculated by said distance calculating means;

(i) gear ratio determining means for determining a second gear ratio range with an upper limit gear ratio providing deceleration from said current vehicle speed to achieve said reference speed by the time the vehicle reaches said specific position; and (j) execution means for executing a down-shift of the automatic transmission to a gear ratio within the second gear ratio range, responsive to detection of the driver's decelerating operation by said deceleration sensor means when said deceleration inference means affirmatively infers the need for deceleration and when a current gear ratio of the automatic transmission does not lie within said gear ratio range determined by said gear ratio determining means.

6. The device according to claim 5 wherein said specific position is a position selected from the group consisting of crossings, curves, expressway exits, and inclines.

7. The device according to claim 5 wherein the automatic transmission has a plurality of transmission stages, said execution means executing a down-shift from a current transmission stage to a lower stage having a gear ratio within the second gear ratio range.

8. An automatic transmission control device for a vehicle, comprising:

(a) road information obtaining means for obtaining road information pertaining to a scheduled drive route;

(b) current position sensor means for detecting a current on-road position of the vehicle;

(c) vehicle speed sensor means for detecting a current speed of the vehicle;

(d) first gear ratio determining means for determining a first gear ratio range for the automatic transmission in accordance with a control program;

(e) deceleration sensor means for detecting a decelerating operation by a driver of the vehicle;

(f) distance calculating means for calculating, from the road information obtained by said road information obtaining means, a distance from the current vehicle position detected by said current position sensor means to a curve located ahead on the scheduled drive route;

(g) curvature calculating means for calculating a radius of curvature of said curve;

(h) second gear ratio determining means for determining, in accordance with said current vehicle speed detected by said vehicle speed sensor means, said distance calculated by said distance calculating means and said radius of curvature of said curve calculated by said curvature calculating means, a second gear ratio range with an upper limit gear ratio which provides sufficient deceleration from said current vehicle speed to a reduced speed at which the vehicle would safely pass through said curve; and (i) execution means for executing a down-shift of the automatic transmission to have a gear ratio within the second gear ratio range, responsive to detection of the driver's decelerating operation by said deceleration sensor means, when a current gear ratio of the automatic transmission does not lie within said second gear ratio range determined by said second gear ratio determining means.

9. The device according to claim 8 wherein the automatic transmission has a plurality of transmission stages, said execution means executing a down-shift from a current transmission stage to a lower stage having a gear ratio within the second gear ratio range.

10. An automatic transmission control device for a vehicle, comprising:

(a) road information obtaining means for obtaining road information pertaining to a scheduled drive route;

(b) current position sensor means for detecting a current on-road position of the vehicle;

(c) vehicle speed sensor means for detecting a current speed of the vehicle;

(d) first gear ratio determining means for determining a first gear ratio range for the transmission in accordance with a control program;

(e) deceleration sensor means for detecting a decelerating operation by a driver of the vehicle;

(f) distance calculating means for calculating, from the road information obtained by said road information obtaining means, a distance from the current vehicle position detected by said current position sensor means to a specific position located ahead on the scheduled drive route;

(g) speed calculating means for calculating a reference speed at which the vehicle would safely pass through said specific position;

(h) second gear ratio determining means for determining, in accordance with said current vehicle speed detected by said vehicle speed sensor, said distance calculated by said distance calculating means and said reference speed calculated by said speed calculating means, a second gear ratio range with an upper limit gear ratio which provides deceleration from said current vehicle speed to achieve said reference speed by the time the vehicle reaches said specific position; and (i) execution means for executing a down-shift of the automatic transmission to a gear ratio within the second gear ratio range responsive to detection of the driver's decelerating operation by said deceleration sensor means and when a current gear ratio of the automatic transmission does not lie within said second gear ratio range determined by said second gear ratio determining means.

11. The device according to claim 10 comprising at least two of said second gear ratio determining means which individually determine second gear ratio ranges, each with an upper limit gear ratio, said second gear ratio ranges providing sufficient deceleration from said current vehicle speed to said reference speed at different specific positions, said device further comprising selecting means for selecting one of the second gear ratio ranges having the lowest upper limit gear ratio, said executing means executing the down-shift into the selected second gear ratio range.

12. The device according to claim 10 wherein the automatic transmission has a plurality of transmission stages, said execution means executing a down-shift from a current transmission stage to a lower stage having a gear ratio within the second gear ratio range.

13. An automatic transmission control device for a vehicle, comprising:
  (a) road information obtaining means for obtaining road information pertaining to a scheduled drive route;
  (b) current position sensor means for detecting a current on-road position of the vehicle;
  (c) vehicle speed sensor means for detecting a current speed of the vehicle;
  (d) first gear ratio determining means for determining a first gear ratio range for the automatic transmission in accordance with a control program;
  (e) road discriminating means for calculating average curvature of one or more curves located within a predetermined section of the scheduled drive route;
  (f) second gear ratio determining means for determining, in accordance with said current vehicle speed detected by said vehicle speed sensor and said average curvature calculated by said road discriminating means, a second gear ratio range with an upper gear ratio for the automatic transmission at which said vehicle would safely run through said predetermined section; and
  (g) execution means for, when a current gear ratio of the automatic transmission does not lie within said second gear ratio range determined by said second gear ratio determining means, executing a down-shift of the automatic transmission to a gear ratio within the second gear ratio range.

14. The device according to claim 13 wherein said road discriminating means further calculates altitude variation in said predetermined section of the scheduled drive route, said second gear ratio determining means determining the upper limit gear ratio in accordance with said altitude variation calculated by said road discriminating means as well as said current vehicle speed and said average curvature.

15. The device according to claim 13 wherein the automatic transmission has a plurality of transmission stages, said execution means executing a down-shift from a current transmission stage to a lower stage having a gear ratio within the second gear ratio range.

16. An automatic transmission control device for a vehicle, comprising:
  (a) road information obtaining means for obtaining road information pertaining to a scheduled drive route;
  (b) current position sensor means for detecting a current on-road position of the vehicle;
  (c) vehicle speed sensor means for detecting a current speed of the vehicle;
  (d) a plurality of transmission control programs for defining shift change timing for an automatic transmission;
  (e) road discriminating means for calculating altitude variation in a predetermined section of the scheduled drive route;
  (f) program selecting means for selecting a specific one of said transmission control programs in accordance with a combination of said current vehicle speed detected by said vehicle speed sensor and said altitude variation calculated by said road discriminating means; and
  (g) execution means for providing a gear ratio within a range defined by said specific transmission control program selected by said program selecting means.

17. The device according to claim 16 wherein the road information obtained by said road information obtaining means includes coordinates and altitudes of points on the scheduled drive route.

* * * * *